United States Patent
Isogai et al.

(10) Patent No.: US 8,355,811 B2
(45) Date of Patent: Jan. 15, 2013

(54) CLOTHING SIMULATION APPARATUS, CLOTHING SIMULATION PROGRAM, AND CLOTHING SIMULATION METHOD

(75) Inventors: Yumiko Isogai, Otsu (JP); Mariko Matsui, Otsu (JP); Kiyoshi Negishi, Otsu (JP); Sonoko Ishimaru, Otsu (JP); Chisato Nonomura, Otsu (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 341 days.

(21) Appl. No.: 12/934,197

(22) PCT Filed: Jan. 22, 2009

(86) PCT No.: PCT/JP2009/050951
§ 371 (c)(1),
(2), (4) Date: Sep. 23, 2010

(87) PCT Pub. No.: WO2009/119146
PCT Pub. Date: Oct. 1, 2009

(65) Prior Publication Data
US 2011/0022372 A1    Jan. 27, 2011

(30) Foreign Application Priority Data
Mar. 24, 2008  (JP) .................................. 2008-076500

(51) Int. Cl.
*G06F 19/00* (2011.01)
(52) U.S. Cl. ....................................................... 700/132
(58) Field of Classification Search .......... 700/130–133; 345/419, 420; 703/11; 705/27.2
See application file for complete search history.

(56) References Cited

U.S. PATENT DOCUMENTS

| | | | |
|---|---|---|---|
| 6,310,627 B1 * | 10/2001 | Sakaguchi | 345/630 |
| 6,546,309 B1 * | 4/2003 | Gazzuolo | 700/132 |
| 7,079,134 B2 * | 7/2006 | Kung et al. | 345/420 |
| 7,149,665 B2 * | 12/2006 | Feld et al. | 700/131 |
| 7,379,786 B2 | 5/2008 | Koichi | |

(Continued)

FOREIGN PATENT DOCUMENTS

| | | |
|---|---|---|
| JP | 9-34952 A | 2/1997 |
| JP | 9-273017 A | 10/1997 |
| JP | 2000-242683 A | 9/2000 |
| JP | 2005-242611 A | 9/2005 |

OTHER PUBLICATIONS

Niwaya, Haruo et al.; "Predicting Method of Contact Pressure of Fabrics"; Sen-I Gakkaishi, vol. 46, No. 6, (1990), pp. 229-232. (partial English translation).

(Continued)

*Primary Examiner* — Nathan Durham
(74) *Attorney, Agent, or Firm* — Westerman, Hattori, Daniels & Adrian, LLP

(57) ABSTRACT

A clothing simulation apparatus precisely determines clothing pressure for bringing a clothing into tight contact with a human body. A fitting part 22 divides a paper pattern model into a plurality of elements, imparts dynamic characteristics shown by a fabric model to each element, deforms the paper pattern model by solving the motion equation of each element using a finite element method, and then fits the clothing virtually to a human body model. The fitting part 22 sets a temporary model to cover a predetermined section of the human body model, deforms the paper pattern model to bring the paper pattern model into contact with the temporary model, and thereafter deforms the paper pattern model to bring the paper pattern model into contact with the human body model.

10 Claims, 29 Drawing Sheets

U.S. PATENT DOCUMENTS

| | | | |
|---|---|---|---|
| 2001/0026272 A1* | 10/2001 | Feld et al. | 345/419 |
| 2003/0011590 A1* | 1/2003 | Kung et al. | 345/419 |
| 2005/0283267 A1* | 12/2005 | Bingham et al. | 700/132 |
| 2006/0015208 A1* | 1/2006 | Reyes Moreno | 700/132 |
| 2007/0173968 A1 | 7/2007 | Koichi | |
| 2009/0222127 A1* | 9/2009 | Lind | 700/132 |

OTHER PUBLICATIONS

International Search Report of PCT/JP2009/050951, mailing date Apr. 21, 2009.

Extended European Search Report dated Aug. 16, 2012, issued in corresponding European Patent Application No. 09725260.5.

Volino, Pascal et al., "From early virtual garment simulation to interactive fashion design", Computer-Aided Design, vol. 37, No. 6, p. 593-608, May 1, 2005, cited in Extended European Search Report dated Aug. 16, 2012.

Fontana, Marzia et al., "3D virtual apparel design for industrial applications", Computer-Aided Design, vol. 37, No. 6, p. 609-622, May 1, 2005, cited in Extended European Search Report dated Aug. 16, 2012.

* cited by examiner

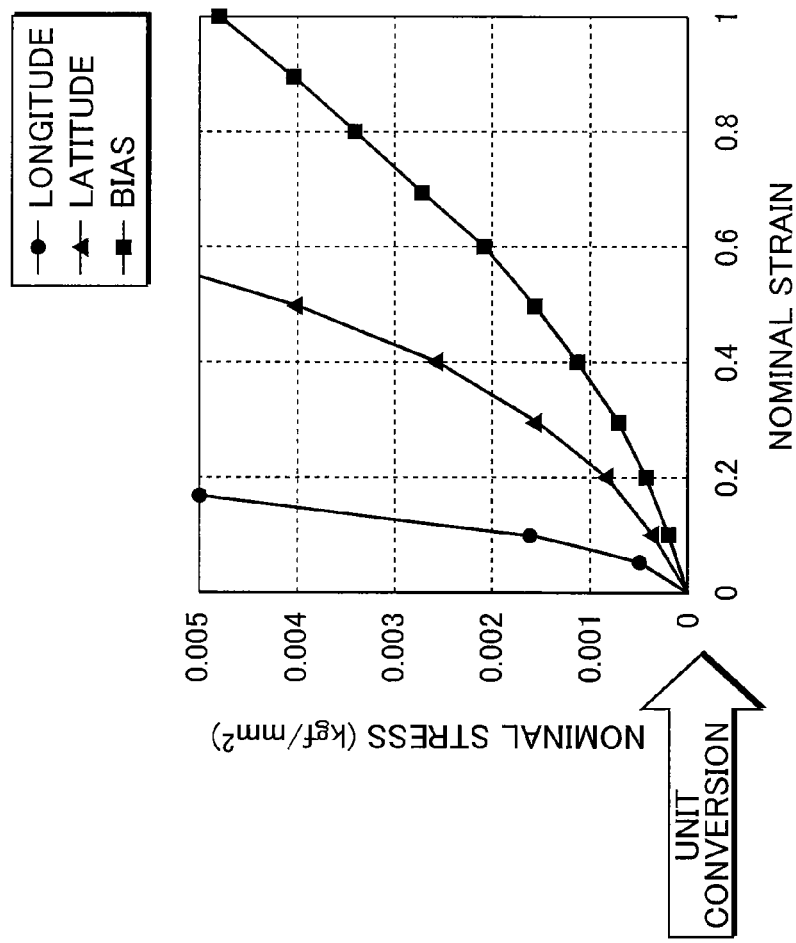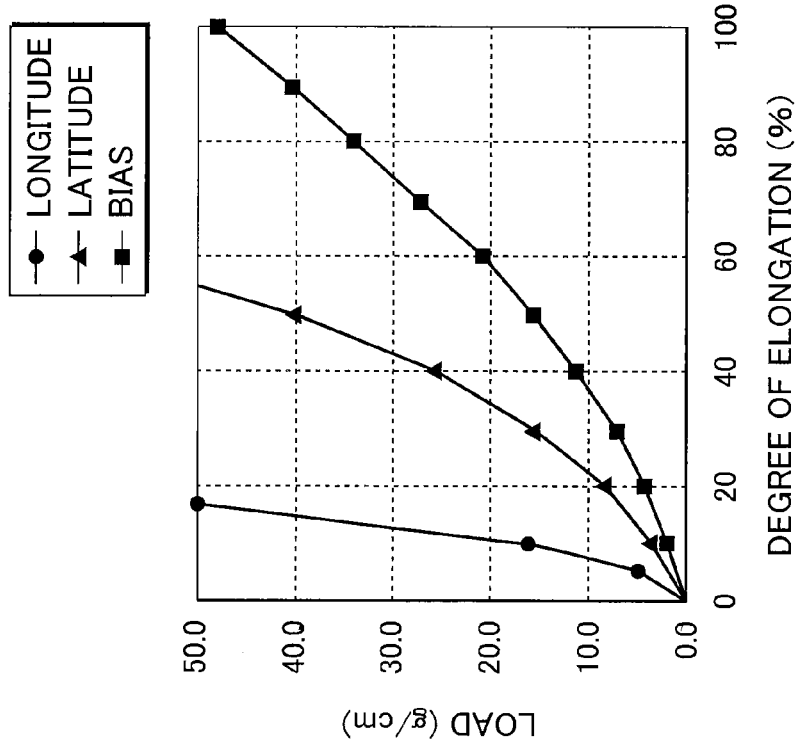

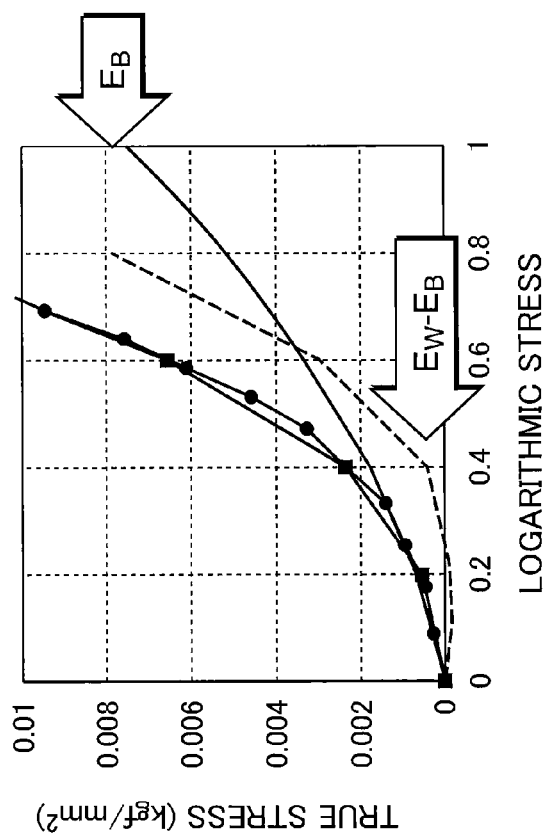
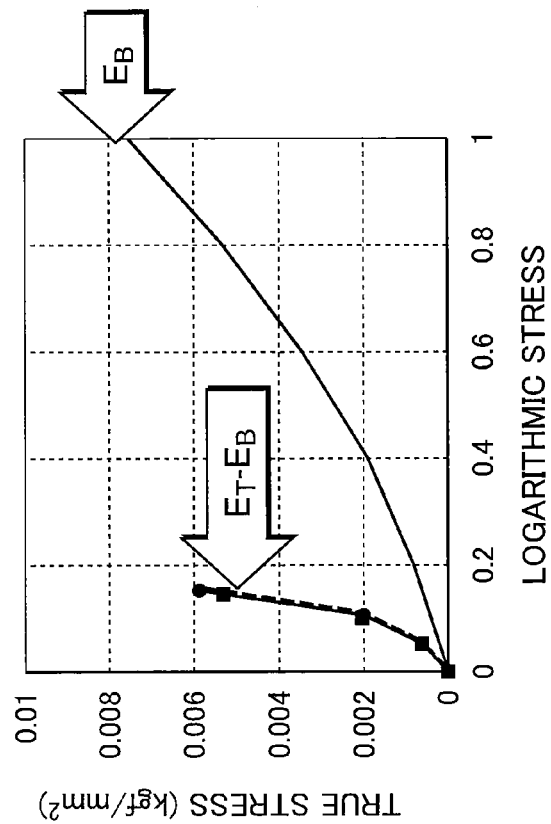
FIG.6A
FIG.6B

| FRONT/BACK BODY PARTS | HUMAN BODY | × |
|---|---|---|
| FRONT/BACK BODY PARTS | TEMPORARY M3 | × |
| RIGHT/LEFT SLEEVES | HUMAN BODY | × |
| RIGHT/LEFT SLEEVES | TEMPORARY M1,2 | O |

| FRONT/BACK BODY PARTS | HUMAN BODY | ○ |
|---|---|---|
| FRONT/BACK BODY PARTS | TEMPORARY M3 | ○ |
| RIGHT/LEFT SLEEVES | HUMAN BODY | × |
| RIGHT/LEFT SLEEVES | TEMPORARY M1,2 | ○ |

| FRONT/BACK BODY PARTS | HUMAN BODY | ○ |
|---|---|---|
| FRONT/BACK BODY PARTS | TEMPORARY M3 | ○ |
| RIGHT/LEFT SLEEVES | HUMAN BODY | ○ |
| RIGHT/LEFT SLEEVES | TEMPORARY M1,2 | × |

| FRONT/BACK BODY PARTS | HUMAN BODY | ○ |
| --- | --- | --- |
| FRONT/BACK BODY PARTS | TEMPORARY M3 | × |
| RIGHT/LEFT SLEEVES | HUMAN BODY | ○ |
| RIGHT/LEFT SLEEVES | TEMPORARY M1,2 | × |

| SUMMARY OF CONTACT DEFINITIONS | | 4 | 5 | 6 | 7 | 8 | 9 |
|---|---|---|---|---|---|---|---|
| FRONT/BACK BODY PARTS | HUMAN BODY | × | ○ | ○ | ○ | ○ | ○ |
| FRONT/BACK BODY PARTS | TEMPORARY M3 | × | ○ | ○ | ○ | × | × |
| RIGHT/LEFT SLEEVES | HUMAN BODY | × | × | × | ○ | ○ | ○ |
| RIGHT/LEFT SLEEVES | TEMPORARY M1,2 | ○ | ○ | ○ | × | × | × |

| RIGHT-SIDE, LEFT-SIDE, FRONT AND BACK PATTERN PAPERS | HUMAN BODY | × |
|---|---|---|
| RIGHT-SIDE, LEFT-SIDE, FRONT AND BACK PATTERN PAPERS | CYLINDER C1,2 | × |
| RIGHT-SIDE, LEFT-SIDE, FRONT AND BACK PATTERN PAPERS | SADDLE BODY K1,2 | × |

| RIGHT-SIDE, LEFT-SIDE, FRONT AND BACK PATTERN PAPERS | HUMAN BODY | × |
|---|---|---|
| RIGHT-SIDE, LEFT-SIDE, FRONT AND BACK PATTERN PAPERS | CYLINDER C1,2 | ○ |
| RIGHT-SIDE, LEFT-SIDE, FRONT AND BACK PATTERN PAPERS | SADDLE BODY K1,2 | ○ |

| RIGHT-SIDE, LEFT-SIDE, FRONT AND BACK PATTERN PAPERS | HUMAN BODY | × |
|---|---|---|
| RIGHT-SIDE, LEFT-SIDE, FRONT AND BACK PATTERN PAPERS | CYLINDER C1,2 | ○ |
| RIGHT-SIDE, LEFT-SIDE, FRONT AND BACK PATTERN PAPERS | SADDLE BODY K1,2 | ○ |

| RIGHT-SIDE, LEFT-SIDE, FRONT AND BACK PATTERN PAPERS | HUMAN BODY | ○ |
|---|---|---|
| RIGHT-SIDE, LEFT-SIDE, FRONT AND BACK PATTERN PAPERS | CYLINDER C1,2 | × |
| RIGHT-SIDE, LEFT-SIDE, FRONT AND BACK PATTERN PAPERS | SADDLE BODY K1,2 | × |

| SUMMARY OF CONTACT DEFINITIONS | | 24 | 25 | 26 | 27 | 28 | 29 | 30 |
|---|---|---|---|---|---|---|---|---|
| RIGHT-SIDE, LEFT-SIDE, FRONT AND BACK PATTERN PAPERS | HUMAN BODY | × | × | × | × | ○ | ○ | ○ |
| RIGHT-SIDE, LEFT-SIDE, FRONT AND BACK PATTERN PAPERS | CYLINDER C1,2 | × | ○ | ○ | ○ | × | × | × |
| RIGHT-SIDE, LEFT-SIDE, FRONT AND BACK PATTERN PAPERS | SADDLE BODY K1,2 | × | ○ | ○ | ○ | × | × | × |

FIG.35A

| CASE1 | MEASUREMENT VALUE | ANALYTICAL VALUE |
|---|---|---|
| CHEST PART | 9 | 9.6 |
| RIB PART | 2 | 2 |
| NAVEL | 2 | 1.8 |

FIG.35B

| CASE2 | MEASUREMENT VALUE | ANALYTICAL VALUE |
|---|---|---|
| CHEST PART | 16 | 17.8 |
| RIB PART | 5 | 3 |
| NAVEL | 3 | 2.7 |

FIG.35C

| CASE3 | MEASUREMENT VALUE | ANALYTICAL VALUE |
|---|---|---|
| CHEST PART | 10 | 9.6 |
| RIB PART | 5 | 5.6 |
| NAVEL | 2.5 | 2.7 |

CLOTHING SIMULATION APPARATUS, CLOTHING SIMULATION PROGRAM, AND CLOTHING SIMULATION METHOD

TECHNICAL FIELD

The present invention relates to a technology for fitting a clothing to a human body model by means of computer simulation.

BACKGROUND ART

Appropriate clothing pressure of a clothing has the effects of improving the exercise functionality, correcting the body shape, and providing a feeling of tension, and is significantly concerned with comfort of the clothing. For this reason, as the functions of the materials become more advanced, the closing, medical and sports field are required to evaluate the contact pressure (clothing pressure) generated between a human body and a clothing.

The clothing pressure is generally measured by inserting a pressure sensor under a clothing while the clothing is applied to a human body. However, it is difficult to accurately measure the clothing pressure using the pressure sensor because the human body is deformed by the pressure sensor itself. It is also not easy to understand the distribution of the clothing pressure because the number of parts to be measured is ten or more at a maximum.

Therefore, in recent years, computer simulation has been attempted to obtain the clothing pressure. Non-patent Document 1 discloses a method for calculating a contact drag, assuming that the force of a clothing pressing the human body is equivalent to the contact drag, and then converting the contact drag to a value per unit area to obtain the clothing pressure. In other words, potential energy is formulated according to the relationship between a stress and strain based on the dynamic characteristics (the weight, flexural characteristics, and tension characteristics) of the clothing, and the fabric shape to be obtained when this potential energy is the minimum value is predicted, whereby the contact drag is calculated.

Moreover, Patent Document 1 discloses a method for repeating the step of determining the presence/absence of contact between a provided clothing shape model and human body shape model and the step of calculating the gravity acting on a clothing, to obtain a contact pressure that acts on the clothing.

Non-patent Document 1: "Method for Predicting Contact Pressure of Fabric" by Haruo Niwaya, Haruki Imaoka, Atsuo Shibuya, and Noboru Aisaka, SEN-I GAKKAISHI (published report), Vol 46, No. 6 (1990), P. 229 to 232

Patent Document 1: Japanese Patent Application Publication No. H9-34952

In Non-patent Document 1, however, the slope of the curve of the potential energy depends strongly on stretch resilience generated by stretching and straining the clothing. Thus, large stretch resilience is calculated even when the stretching and straining of the fabric is less significant, and this large stretch resilience is the cause of a calculation error of the clothing pressure.

Specifically, although only a small strain occurs in warp and weft directions when a large stress is applied, the problem in the method described in Non-patent Document 1 is that, because the large stretch resilience is calculated even when a small stress is applied, the calculation error of the clothing pressure is generated due to this large stretch resilience, and therefore the clothing pressure cannot be obtained accurately.

In Patent Document 1, it is determined that the human body shape model and the clothing model come into contact with each other when the human body shape model and the clothing model are approach each other approximately 1 cm. Therefore, the clothing pressure for bringing the clothing into tight contact with the human body cannot be obtained accurately.

DISCLOSURE OF THE INVENTION

An object of the present invention is to provide a clothing simulation technology capable of accurately obtaining the clothing pressure for bringing a clothing into tight contact with a human body.

(1) A clothing simulation apparatus according to the present invention has: human body model acquisition means for acquiring a human body model showing a three-dimensional shape of a human body; paper pattern model acquisition means for acquiring a paper pattern model showing a two-dimensional shape of a pattern paper of a clothing that is fitted virtually to the human body model; fabric model acquisition means for acquiring a fabric model showing dynamic characteristics of a fabric configuring the clothing; fitting means for dividing the paper pattern model into a plurality of elements, imparting the dynamic characteristics shown by the fabric model to each element, deforming the paper pattern model by solving a motion equation of each element using a finite element method, and then fitting the clothing virtually to the human body model; and clothing pressure calculation means for calculating a clothing pressure that is virtually applied to the human body model by the clothing fitted by the fitting means, wherein the fitting means sets a temporary model that is formed so as to cover a predetermined section of the human body model, deforms the paper pattern model to bring the paper pattern model into contact with the temporary model, and thereafter deforms the paper pattern model to bring the paper pattern model into contact with the human body model.

A clothing simulation program according to the present invention causes a computer to function as: human body model acquisition means for acquiring a human body model showing a three-dimensional shape of a human body; paper pattern model acquisition means for acquiring a paper pattern model showing a two-dimensional shape of a pattern paper of a clothing that is fitted virtually to the human body model; fabric model acquisition means for acquiring a fabric model showing dynamic characteristics of a fabric configuring the clothing; fitting means for dividing the paper pattern model into a plurality of elements, imparting the dynamic characteristics shown by the fabric model to each element, deforming the paper pattern model by solving a motion equation of each element using a finite element method, and then fitting the clothing virtually to the human body model; and clothing pressure calculation means for calculating a clothing pressure that is virtually applied to the human body model by the paper pattern model fitted by the fitting step, wherein the fitting means sets a temporary model that is formed so as to cover a predetermined section of the human body model, deforms the paper pattern model to bring the paper pattern model into contact with the temporary model, and thereafter deforms the paper pattern model to bring the paper pattern model into contact with the human body model.

A clothing simulation method according to the present invention has: a human body model acquisition step in which a computer acquires a human body model showing a three-dimensional shape of a human body; a paper pattern model acquisition step in which the computer acquires a paper pattern model showing a two-dimensional shape of a pattern paper of a clothing that is fitted virtually to the human body model; a fabric model acquisition step in which the computer acquires a fabric model showing dynamic characteristics of a fabric configuring the clothing; a fitting step in which the computer divides the paper pattern model into a plurality of elements, imparts the dynamic characteristics shown by the fabric model to each element, deforms the paper pattern model by solving a motion equation of each element using a finite element method, and then fits the clothing virtually to the human body model; and a clothing pressure calculation step in which the computer calculates a clothing pressure that is virtually applied to the human body model by the paper pattern model fitted by the fitting means, wherein in the fitting step, the fitting means sets a temporary model that is formed so as to cover a predetermined section of the human body model, deforms the paper pattern model to bring the paper pattern model into contact with the temporary model, and thereafter deforms the paper pattern model to bring the paper pattern model into contact with the human body model.

According to these configurations, the dynamic characteristics shown by the fabric model is applied to the paper pattern model, and the temporary model is so set that the predetermined section of the human body model is covered. The motion equation of each element of the paper pattern model is solved using a finite element method, and the paper pattern model is deformed to come into contact with the temporary model. Subsequently, the paper pattern model that is deformed to come into contact with the temporary model is deformed to come into contact with the human body model.

More specifically, the paper pattern model is deformed to come into contact with the temporary model and is thereafter deformed to come into contact with the human body model, thus the solutions of the motion equations can be converged easily, and the wrinkles that are generated when the paper pattern model is deformed to come into contact with the human body model can be reduced. As a result, the clothing pressure of underwear or other clothing for bringing the clothing into tight contact with the human body can be obtained accurately.

(2) It is preferred that the fabric model simulate a shell river structure configured by a base material, a longitude river arrayed in a longitudinal direction within the base material to reinforce the base material, and a latitude river arrayed in a latitudinal direction within the base material to reinforce the base material, that the fabric model express the rigidity of the fabric using a base material rigid component showing the rigidity of the base material, a longitude river rigid component showing the rigidity of the longitude river, and a latitude rigid component showing the rigidity of the latitude river, that the base material rigid component be calculated based on the rigidity in a bias direction of an true fabric, that the longitude river rigid component be applied with a difference between the rigidity in a longitudinal direction of the true fabric and the base material rigid component, and that the latitude river rigid component be applied with a difference between the rigidity in a latitudinal direction of the true fabric and the base material rigid component.

According to this configuration, because the base material rigid component is calculated based on the rigidity in the bias direction of the true fabric, and the longitude river rigid component is applied with a difference between the rigidity in the longitudinal direction of the true fabric and the base material rigid component, the base material rigid component is offset when the fabric is stretched in the longitudinal direction, and consequently the rigidity of the fabric is shown only by the rigidity in the longitudinal direction of the true fabric. Also, when the fabric is stretched in the latitudinal direction, the base material rigid component is offset, and the rigidity of the fabric is shown only by the rigidity in the latitudinal direction of the true fabric. Thus, a fabric model that reproduces the rigidity of the fabric accurately can be provided.

(3) It is preferred that the temporary model have a smoothly-curved surface.

According to this configuration, because the temporary model has a smoothly-curved surface, it is possible not only to converge the solutions of the motion equations easily, but also to prevent the generation of wrinkles and at the same time to deform the paper pattern model so that it comes into tight contact with the human body model.

(4) It is preferred that the temporary model be in the shape of a cylinder, an ellipsoidal body, a saddle, a polygonal pyramid or a circular cone.

According to this configuration, a cylindrical, ellipsoidal, saddle-shaped, polygonal pyramidal or circular conical shape with no bumps is adopted for the temporary model. Therefore, it is possible not only to converge the solutions of the motion equations easily, but also to prevent the generation of wrinkles and at the same time to deform the paper pattern model so that it comes into tight contact with the human body model.

(5) It is preferred that the base material rigid component be calculated based on a function of strain energy generated by superelasticity.

According to this configuration, the rigidity of the base material rigid component in the bias direction of the fabric is calculated based on the function of strain energy of superelasticity and the Young's modulus of the true fabric. Therefore, the base material rigid component can be expressed using an existing mathematical model.

(6) It is preferred that the clothing be an upper-body clothing, that the paper pattern model include paper pattern models for a front body part, back body part, left sleeve and right sleeve, and that the fitting means set a cylindrical temporary model on a left arm and right arm of the human body and set the cylindrical temporary model such that an axial direction thereof follows a straight line connecting both shoulders.

According to this configuration, a T-shirt having the front body part, back body part, left sleeve and right sleeve can be fitted to the human body model tightly.

(7) It is preferred that the clothing be an upper-body clothing, that the paper pattern model include paper pattern models for a front body part and back body part, and that the fitting means set a cylindrical temporary model such that an axial direction thereof follows a straight line connecting both shoulders of the human body model.

According to this configuration, a tank top having the front body part and the back body part can be fitted to the human body model tightly.

(8) It is preferred that the clothing be a lower-body clothing, that the paper pattern model include paper pattern models for a left leg and right leg, and that the fitting means set a cylindrical temporary model on the left leg and the right leg of the human body model and set a saddle-shaped temporary model on a hip of the human body model such that a ridge line thereof is laid in parallel to a horizontal direction of the human body model and faces the legs.

According to this configuration, a lower-body clothing having the front side of the left leg, the front side of the right leg, the back side of the left leg and the back side of the right leg can be fitted to the human body tightly.

According to this configuration, the clothing pressure of underwear or other clothing for bringing the clothing into tight contact with the human body can be obtained accurately.

BRIEF DESCRIPTION OF THE DRAWINGS

FIG. 5(a) is a graph showing load-degree of elongation characteristics, and FIG. 5(b) is a graph showing nominal stress-nominal strain characteristics.

FIG. 6 is a graph showing true stress-logarithmic strain characteristics of a base material.

FIG. 35 is a table showing an experimental result.

- 10 Operating part
- 20 Controller
- 21 Data acquisition part
- 22 Fitting part
- 23 Garment pressure calculation part
- 30 Storage unit
- 31 Human body model storage unit
- 32 Pattern paper model storage unit
- 33 Fabric model storage unit
- 40 Display controller
- 50 Display part

BEST MODE FOR CARRYING OUT THE INVENTION

Figure 1:
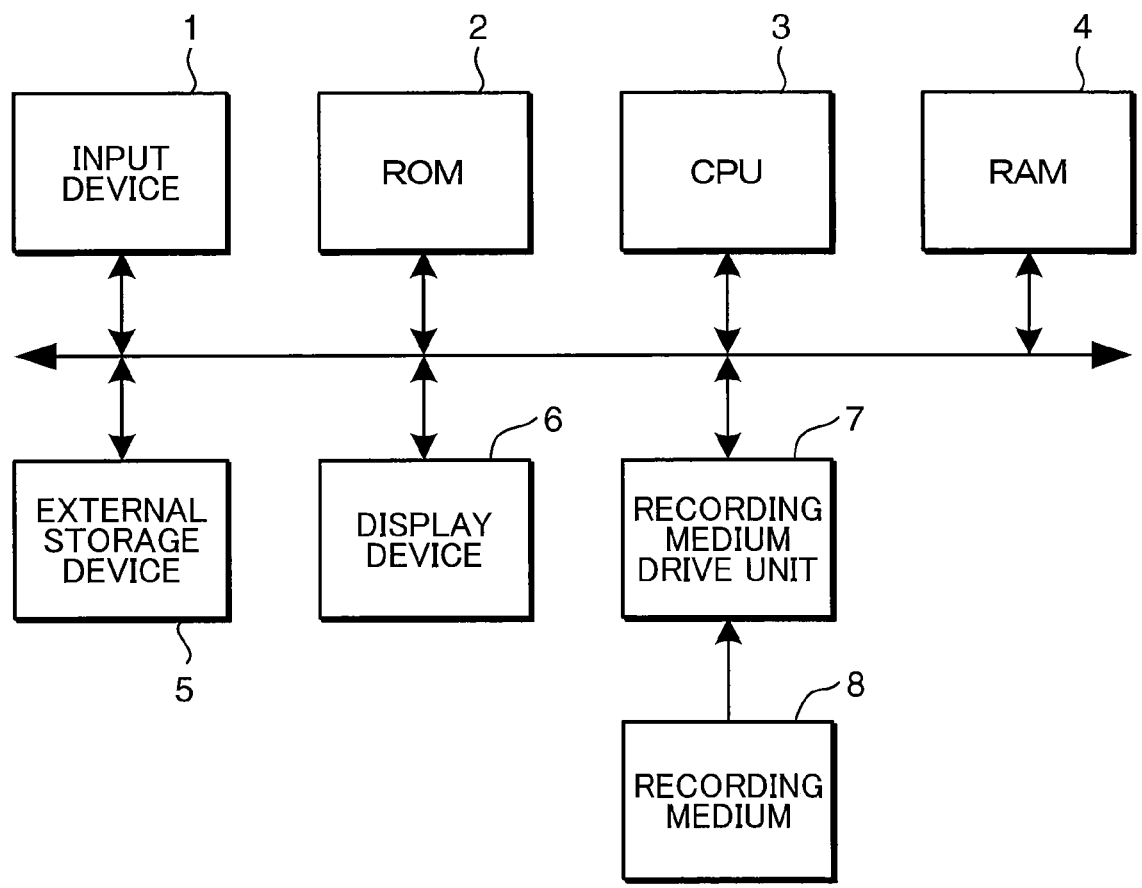
FIG. 1 is a block diagram showing a hardware construction of a clothing simulation apparatus according to an embodiment of the present invention.

A clothing simulation apparatus according to an embodiment of the present invention is described hereinafter. FIG. 1 is a block diagram showing a hardware construction of the clothing simulation apparatus according to the embodiment of the present invention. This clothing simulation apparatus is configured by a normal computer and the like and has an input device 1, ROM (read-only memory) 2, CPU (central processing unit) 3, RAM (random access memory) 4, external storage device 5, display device 6, and recording medium drive unit 7. The input device 1, ROM 2, CPU 3, RAM 4, external storage device 5, display device 6 and recording medium drive unit 7 are connected to an internal bus, through which various data are input, and various processes are executed under the control of the CPU 3.

The input device 1 is configured by a keyboard, mouse and the like, and is used by a user to input the various data. The ROM 2 has stored therein a system program, such as BIOS (Basic Input/Output System). The external storage device 5 is configured by a hard disk drive and the like and has stored therein a predetermined OS (Operating System) and a clothing simulation program. The CPU 3 reads the OS and the like from the external storage device 5 and controls the operation of each block. The RAM 4 is used as a work area of the CPU 3.

The display device 6 is configured by a liquid crystal display device or the like and displays various images under the control of the CPU 3. The recording medium drive unit 7 is configured by a CD-ROM drive, flexible disk drive, and the like.

Note that the clothing simulation program is stored in a computer-readable recording medium 8, such as a CD-ROM, and distributed to the market. The user installs the clothing simulation program on the computer by causing the recording medium drive unit 7 to read this recording medium 8. The clothing simulation program may be installed in the computer by storing the clothing simulation program in the Internet server and downloading the clothing simulation program from this server.

Figure 2:
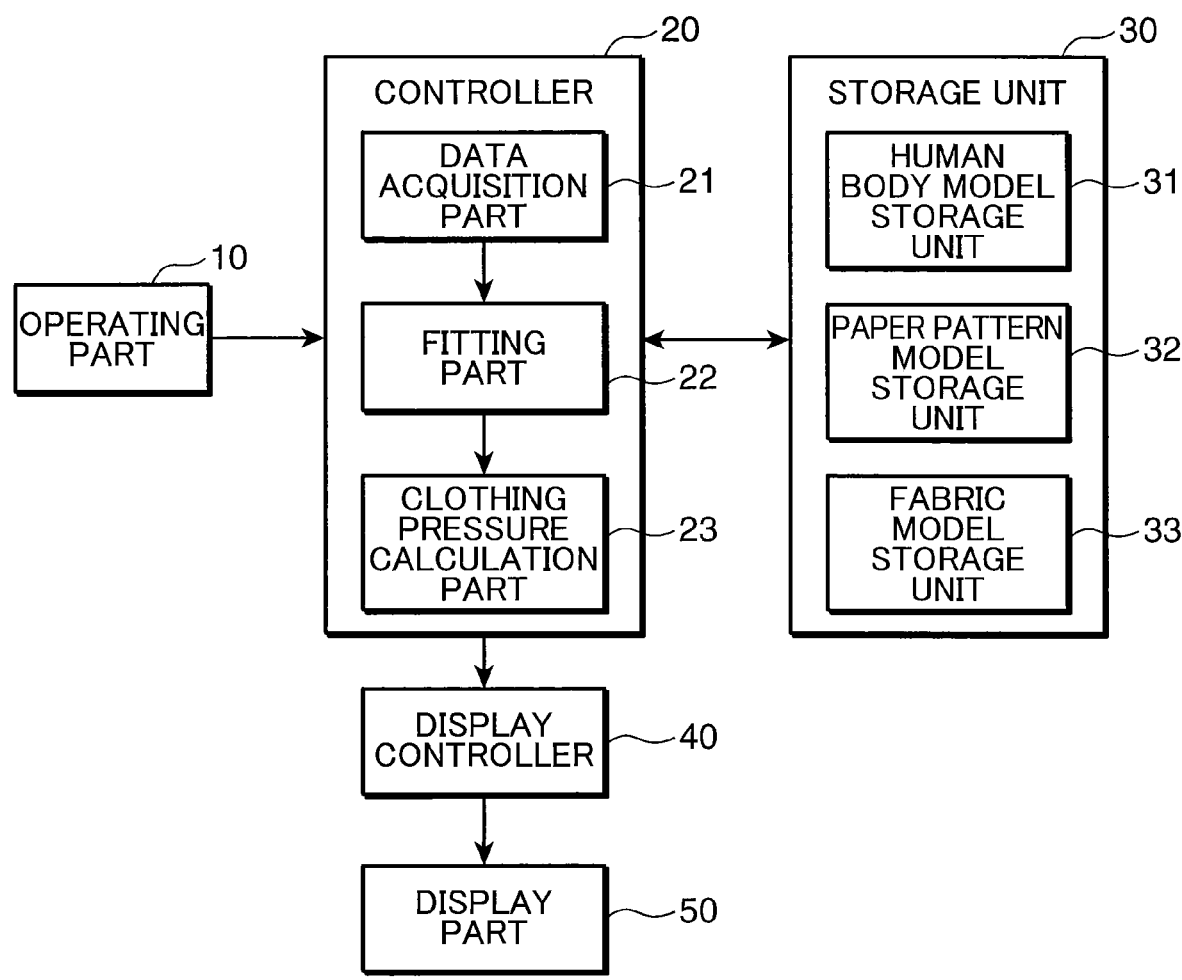
FIG. 2 is a functional block diagram showing the clothing simulation apparatus shown in FIG. 1.

FIG. 2 is a functional block diagram of the clothing simulation apparatus shown in FIG. 1. The clothing simulation apparatus has an operating part 10, controller 20, storage unit 30, display controller 40, and display part 50. The operating part 10 is configured by the input device 1 shown in FIG. 1 and receives various operation inputs from the user.

The controller 20 is configured by the CPU 3 shown in FIG. 1 and has a data acquisition part 21 (same as the examples of the human body model acquisition means, paper pattern model acquisition means, and fabric model acquisition means), a fitting part 22 (same as the example of the fitting means), and a clothing pressure calculation part 23 (same as the example of the clothing pressure calculation means). These functions are realized by causing the CPU to execute the clothing simulation program.

The data acquisition part 21 acquires a human body model showing a three-dimensional shape of a human body. Here, the human body model is obtained by three-dimensionally measuring an true human or mannequin, and the shape of the surface of the human body is expressed using, for example, a three-dimensional polygonal mesh.

The data acquisition part 21 also acquires a paper pattern model showing the two-dimensional shape of a pattern paper of a clothing that is fitted virtually to the human body model. The one that is modeled using apparel CAD can be adopted as the paper pattern model.

Figure 4:
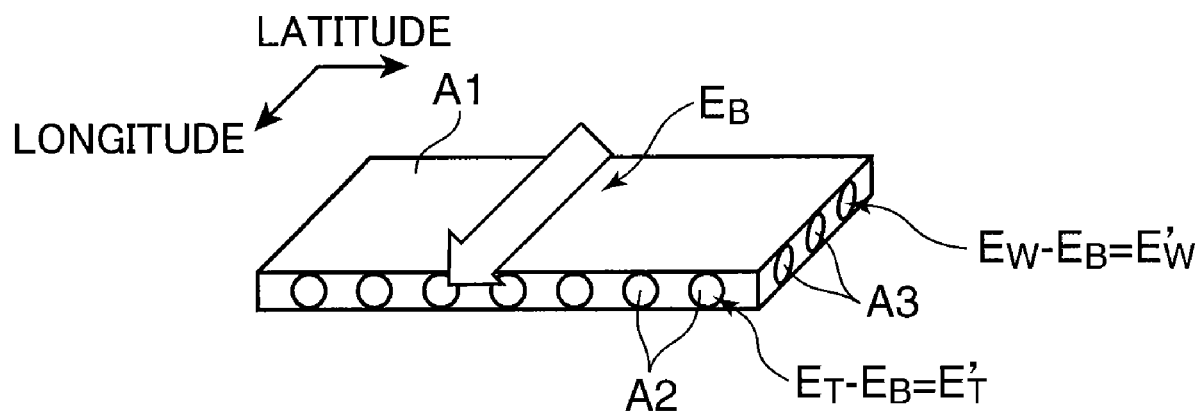
FIG. 4 is an explanatory diagram of a fabric model.

The data acquisition part 21 also acquires a fabric model showing the dynamic characteristics of a fabric configuring the clothing. FIG. 4 is an explanatory diagram of the fabric model. The fabric model simulates a shell river structure that is configured by a base material A1, a longitude river A2 arrayed in a longitudinal direction within the base material A1 to reinforce the base material A1, and a latitude river A3 arrayed in a latitudinal direction within the base material A1 to reinforce the base material A1. The shell river structure is used in reinforced concrete.

The fabric model shows the rigidity of the fabric by means of a base material rigid component EB showing the rigidity of the base material A1, a longitude river rigid component ET' showing the rigidity of the longitude river A2, and a latitude river rigid component EW' showing the rigidity of the latitude river A3.

The base material rigid component EB is calculated based on the rigidity in a bias direction of an true fabric, and the longitude river rigid component ET' is applied with a difference between the rigidity ET in a longitudinal direction of the true fabric and the base material rigid component EB (=ET-EB). The latitude river rigid component EW' is applied with a difference between the rigidity EW in a latitudinal direction of the true fabric and the base material rigid component EB (=EW-EB).

Thus, when the fabric is stretched in the longitudinal direction, the base material rigid component EB is offset and only the rigidity of the fabric is expressed only by the rigidity ET. Also, when the fabric is stretched in the latitudinal direction, as in the case of the longitudinal direction, the base material rigid component is offset and the rigidity of the fabric is expressed only by the rigidity EW. Thus, a fabric model that reproduces the rigidity of the fabric accurately can be provided.

Returning to FIG. 2, the fitting part 22 divides the paper pattern model into a plurality of elements, imparts the dynamic characteristics shown by the fabric model to each element, deforms the paper pattern model by solving the motion equation of each element using a finite element method, and virtually fits the clothing to the human body model.

The fitting part 22 sets a temporary model that is formed so as to cover a predetermined section of the human body model, performs contact definition on the temporary model to solve the motion equations, and deforms the paper pattern model such that the paper pattern model comes into contact with the temporary model. This fitting part 22 then performs contact definition on the human body model to solve the motion equations, and deforms the paper pattern model such that the paper pattern model comes into contact with the human body model.

Because the paper pattern model is deformed to come into contact with the temporary model and thereafter deformed to come into contact with the human body model, the solutions of the motion equations can be converged easily, and the wrinkles that are generated when the paper pattern model is deformed to come into contact with the human body model can be reduced. Note that the temporary model is preferably in the shape of a cylinder. The solutions of the motion equations can be converged easily by adopting a cylinder with less bumps as the temporary model.

The clothing pressure calculation part 23 calculates, for each element set for the paper pattern model, the clothing pressure that is generated virtually on the human body model by the clothing fitted by the fitting part 22.

The display controller 40 is configured by the CPU 3 and displays various images on the display part 50 under the control of the controller 20. The display controller 40 may generate an image that graphically displays the clothing pressure at which the clothing model deformed by the fitting part 22 is shown three-dimensionally at the luminance corresponding to the magnitude of the clothing pressure calculated by the clothing pressure calculation part 23, and then display the image on the display part 50. The display controller 40 may display the clothing pressure on the display part 50 using numerical values. In this case, an image showing the clothing pressure of each element in table form may be displayed on the display part 50. Moreover, the display part 50 may be caused to display an operation image that allows the user to select a section for finding out the clothing pressure, and then the operating part 10 may be used to graphically or numerically display the clothing pressure corresponding to the section selected by the user.

The storage unit 30 is configured by the external storage device 5 and has a human body model storage unit 31, a paper pattern model storage unit 32, and a fabric model storage unit 33. The human body model storage unit 31 to fabric model storage unit 33 store the human body model, paper pattern model and fabric model that are acquired by the data acquisition part 21.

The display part 50 is configured by the display device 6 and displays various images under the control of the controller 20.

A procedure for creating the fabric model is described next. First, load-degree of elongation characteristics that shows the relationship between the load and the degree of elongation of an true fabric configuring a clothing to be simulated is obtained experimentally. Specifically, a Tensilon test is carried out to stretch a 25 mm×5 mm true fabric in the longitudinal direction, latitudinal direction and bias direction, thereby obtaining experimental data showing the load-degree of elongation characteristics in the longitudinal direction, latitudinal direction and bias direction. Note that the bias direction is 45 degrees.

FIG. 5(a) is a graph showing the load-degree of elongation characteristics, wherein the vertical axis shows the load (g/cm) and the horizontal axis shows the degree of elongation (%). In FIG. 5(a), the left, middle and right curves represent the load-degree of elongation characteristics of the longitudinal direction, latitudinal direction and bias direction respectively.

Next, the units of the experimental data showing the load-degree of elongation characteristics are converted to obtain experimental data showing the nominal stress-nominal strain characteristics. FIG. 5(b) is a graph showing the nominal stress-nominal strain characteristics, wherein the vertical axis shows the nominal stress (kgf/mm$^2$) and the horizontal axis shows the nominal strain. In FIG. 5(b), the left, middle and right curves represent the nominal stress-nominal strain characteristics of the longitudinal direction, latitudinal direction and bias direction respectively.

Subsequently, curve fitting is performed on the experimental data showing the nominal stress-nominal strain characteristics of the bias direction, to obtain a function showing the nominal stress-nominal strain characteristics of the bias direction.

Then, Young's modulus E of the bias direction of the fabric is obtained from the initial gradient of the function showing the nominal stress-nominal strain characteristics. In this case, the gradient of the function showing the nominal stress-nominal strain characteristics of the bias direction when the nominal strain is 0.1 is adopted as the initial gradient.

Next, E/6 is obtained by dividing the Young's modulus E by 6. Thereafter, the base material rigid component EB is obtained by substituting the E/6 for a second order partial differential derivative of a strain energy function for a Neo-Hookean (an example of superelasticity) adopted as a mathematical model of the base material A1. Note that the Neo-Hookean is a mathematical model that shows the relationship between strain and energy of an isotropic elastic body such as a rubber.

Note only the Neo-Hookean but also, for example, Ogden or Mooney-Rivlin may be adopted as the mathematical model of the base material A1.

The second order partial differential derivative $\partial^2 W_{neo}/\partial\epsilon^2$ generated from strain of the strain energy function $W_{neo}$ for the Neo-Hookean is expressed as $C_{10}$ (I1−3)=2$C_{10}$ (2$e^{2\epsilon}$+ $e^{-\epsilon}$). The base material rigid component EB can be calculated by substituting the E/6 for $C_{10}$, which is a material constant.

Next, the units of the experimental data showing the nominal stress-nominal strain characteristics of the longitudinal direction and the latitudinal direction shown in FIG. 5(b) are converted to obtain the true stress-logarithmic strain characteristics of the longitudinal direction and the latitudinal direction. Thereafter, a predetermined function is used to perform curve fitting on experimental data showing the true stress-logarithmic strain characteristics of the longitudinal direction and the latitudinal direction, to obtain a function showing the true stress-logarithmic strain characteristics of the longitudinal direction and the latitudinal direction. For example, a quadratic function can be adopted as the predetermined function. Hereinafter, the function showing the true stress-logarithmic strain characteristics of the longitudinal direction and the latitudinal direction are expressed as A'$\epsilon^2$+B'$\epsilon$+C' and A$\epsilon^2$+B$\epsilon$+C respectively.

Next, a function that is obtained by the difference between the function showing the nominal stress-nominal strain characteristics of the longitudinal direction and the base material rigid component EB is calculated as the longitude river rigid component ET'.

Subsequently, a function that is obtained by the difference between the function showing the nominal stress-nominal strain characteristics of the latitudinal direction and the base material rigid component EB is calculated as the latitude river rigid component EW'.

FIG. 6 is a graph showing the true stress-logarithmic strain characteristics of the base material, wherein the vertical axis shows the true stress (kgf/mm$^2$) and the horizontal axis shows the logarithmic strain. The function represented as ET-EB in FIG. 6(a) shows the longitude river rigid component ET', while EW-EB in FIG. 6(b) shows the latitude river rigid component EW'.

In this manner described above, the base material rigid component EB, the longitude river rigid component ET' and the latitude river rigid component EW' are calculated.

Next, the processes performed by the fitting part are described in detail. First of all, a D matrix (stress-strain matrix) is generated from the dynamic characteristics shown by the clothing model. The D matrix is expressed by Formula (1).

[Formula 1]

$$(\sigma) = [D](\varepsilon) \quad (1)$$

$$\begin{pmatrix} \sigma_x \\ \sigma_y \\ \sigma_z \\ \tau_{xy} \\ \tau_{yz} \\ \tau_{zx} \end{pmatrix} = \begin{pmatrix} E_{11} & E_{12} & 0 & 0 & 0 & 0 \\ & E_{22} & 0 & 0 & 0 & 0 \\ & & E_{33} & 0 & 0 & 0 \\ & & & E_{44} & 0 & 0 \\ & sym. & & & E_{55} & 0 \\ & & & & & E_{66} \end{pmatrix} \begin{pmatrix} \varepsilon_x \\ \varepsilon_y \\ \varepsilon_z \\ \gamma_{xy} \\ \gamma_{yz} \\ \gamma_{zx} \end{pmatrix}$$

$$[D] = \begin{pmatrix} E_{11} & E_{12} & 0 & 0 & 0 & 0 \\ & E_{22} & 0 & 0 & 0 & 0 \\ & & E_{33} & 0 & 0 & 0 \\ & & & E_{44} & 0 & 0 \\ & sym. & & & E_{55} & 0 \\ & & & & & E_{66} \end{pmatrix}$$

($\sigma$) represents a stress vector and ($\epsilon$) a strain vector. The letter x represents a weft direction, y a warp direction, and z a direction perpendicular to the x and y.

$E_{11}$ = Base material rigid component $EB$ +

Latitude river rigid component $EW'$ $= \partial^2 W_{neo}/\partial\varepsilon^2 + EW'$ $= 2C_{10}(2e^{2\varepsilon} + e^{-\varepsilon}) + (A\varepsilon^2 + B\varepsilon + C)$ $E_{22}$ = Base material rigid component $EB$ +

Longitudinal river rigid component $ET'$ $= \partial^2 W_{neo}/\partial\varepsilon^2 + ET'$ $= 2C_{10}(2e^{2\varepsilon} + e^{-\varepsilon}) + (A'\varepsilon^2 + B'\varepsilon + C')$ $E_{ij} = \partial^2 W_{neo}/\partial\varepsilon_i\partial\varepsilon_j$ (EX: $E_{12} = \partial^2 W_{neo}/\partial\varepsilon_1\partial\varepsilon_2$)

In other words, the fitting part 22 applies the dynamic characteristics shown by the fabric model to the paper pattern model by substituting the EB, EW' and ET' of the fabric model for the D matrix.

Thereafter, the fitting part 22 uses the finite element method to appropriately perform definition for the contact targets of the paper pattern model and the temporary model and solve the motion equation of each element of the paper pattern model, thereby deforming the paper pattern model. Deformation of the paper pattern model using the finite element method can be realized by using, for example, finite element software called ABAQUS. In this case, the paper pattern model can be deformed to come into contact with the temporary model and the human body model, by defining the D matrix, the paper pattern model, the temporary model and human body model to be contacted, external force and the like using the ABAQUS.

Figure 3:
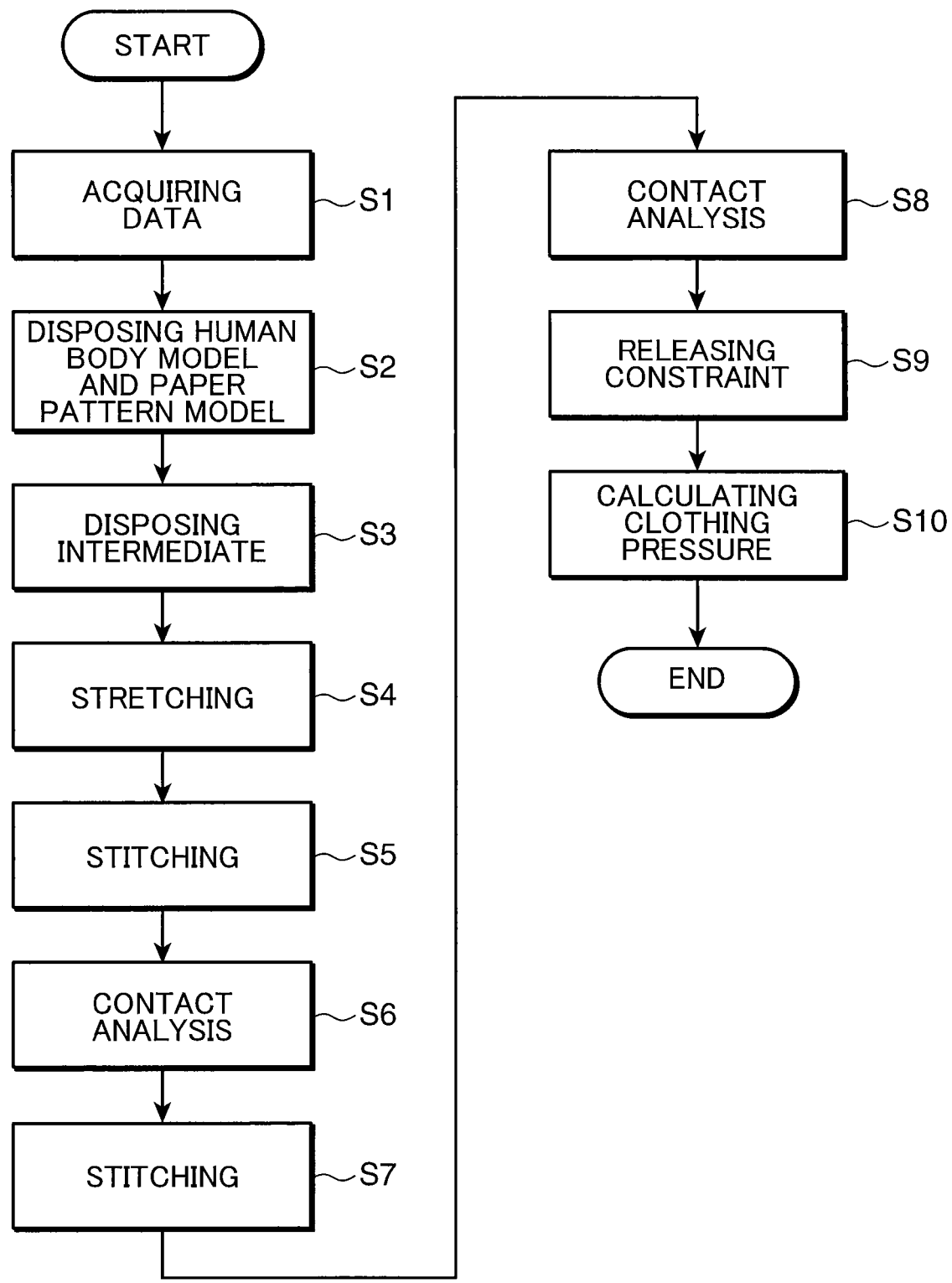
FIG. 3 is a flowchart showing operations of the clothing simulation apparatus that are performed when a T-shirt is adopted as a clothing.

Next is described the operations of the clothing simulation apparatus that are performed when a T-shirt, an example of an upper-body clothing, is adopted as the clothing. FIG. 3 is a flowchart showing the operations of the clothing simulation apparatus that are performed when a T-shirt is adopted as the clothing. First, the data acquisition part 21 acquires the human body model, paper pattern model and fabric model (step S1).

Figure 7:
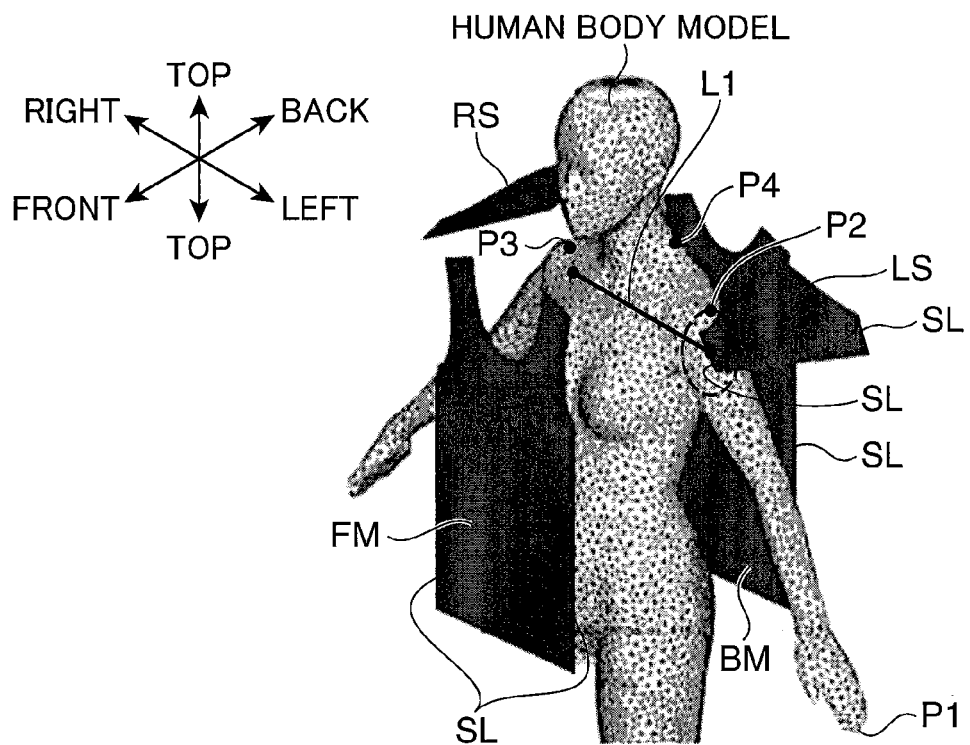
FIG. 7 is a diagram showing a human body model and a paper pattern model that are disposed in a virtual three-dimensional space.

Next, the fitting part 22 disposes the human body model and the paper pattern model in predetermined initial positions within a virtual three-dimensional space (step S2). FIG. 7 is a diagram showing the human body model and the paper pattern model that are disposed within the virtual three-dimensional space. In this flowchart, the T-shirt is adopted as the clothing. Therefore, the paper pattern model includes four paper pattern models for a front body part FM, back body part BM, left sleeve LS and right sleeve RS.

As shown in FIG. 7, the front body part FM is disposed in a position that is located in front of the chest of the upper body of the human body model by a predetermined distance, and the back body part BM is disposed in a position that is located on the back of the upper body of the human body model by a predetermined distance. In addition, the left sleeve LS is disposed above the left shoulder of the human body model, and the right sleeve RS is disposed above the right shoulder of the human body model.

Figure 8:
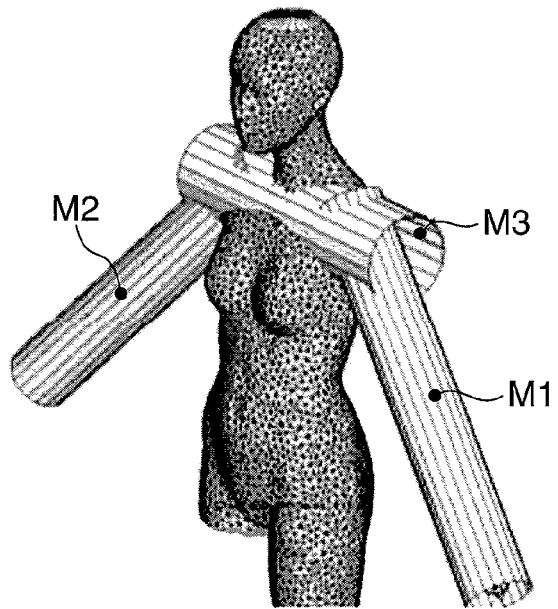
FIG. 8 is a diagram showing the human body model having a temporary model disposed therein.

The fitting part 22 then disposes the temporary model in a predetermined initial position within the virtual three-dimensional space (step S3). FIG. 8 is a diagram showing the human body model having the temporary model disposed therein. As shown in FIG. 8, the temporary model is in the shape of a cylinder and includes three temporary models: a temporary model M1 that is disposed to cover the entire left arm, a temporary model M2 that is disposed to cover the entire right arm, and a temporary model M3 that is disposed to cover the joints between each shoulder and each arm such that the axial direction thereof follows a straight line connecting the both shoulders.

Specifically, as the length of the axial direction of the temporary model M1, the distance between a left fingertip point P1 and a left shoulder tip point P2 or a distance that has some margin to the abovementioned distance can be adopted. As the length of the diameter of the temporary model M1, the length of the diameter of a circle that is larger than the maximum cross-sectional area of the section of the left arm between the fingertip point P1 and the shoulder tip point P2 can be adopted.

Moreover, the temporary model M1 is disposed such that a long axis thereof overlaps with a straight line that connects the central point of the cross section of the left arm in the left shoulder tip point P2 and the fingertip point P1.

As in the case of the temporary model M1, a value obtained based on the size of the right arm can be adopted as the length of the axial direction and the radius of the temporary model M2. The temporary model M2 is also disposed in the same manner as the temporary model M1.

As the length of the axial direction of the temporary model M3, the distance between a shoulder-width line L1 and a neck side point P4 or a distance that has some margin to the abovementioned distance can be adopted. The temporary model M3 is disposed such that a long axis thereof overlaps with the shoulder-width line L1. As the length of the diameter of the temporary model M3, the diameter of a circumscribed circle of the cross section of the left arm at the shoulder tip point P2 or a value obtained by adding some margin to this diameter can be adopted. In FIG. 8, a lower region of the temporary model M3 is wedged into the human body model.

Figures 9, 10:
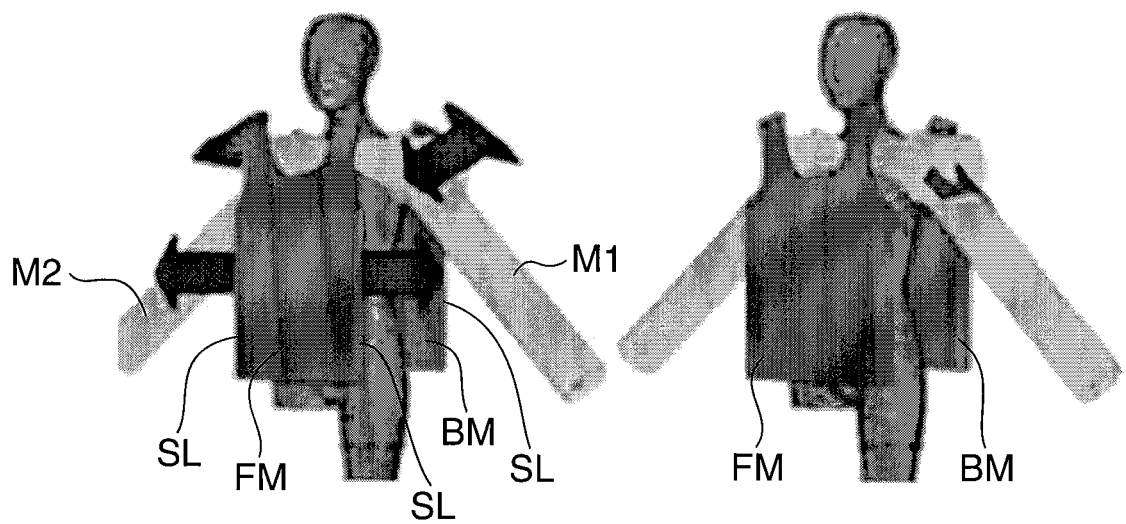
FIG. 9 is an explanatory diagram of step S4.
FIG. 10 is a table showing contact definitions.

Next, the fitting part 22 imparts the dynamic characteristics shown by the fabric model to the node points between the paper pattern model s and applies a predetermined external force such as gravity thereto. As shown in FIG. 9, the front body part FM and the back body part BM are stretched so that a left sideline SL of the front body part FM and a left sideline SL of the back body part BM are brought close to each other up to a predetermined distance and a right sideline SL of the front body part FM and a right sideline SL of the back body part BM are brought close to each other up to a predetermined distance (step S4).

The fitting part 22 stretches the left sleeve LS such that a front side line SL of the left sleeve LS (see FIG. 7) and a back sideline SL of the same are brought close to each other up to a predetermined distance and such that the temporary model M1 is covered. The right sleeve RS is also stretched in the same manner as with the left sleeve LS.

Here, the fitting part 22 stretches each of the paper pattern models in accordance with predefined contact definitions shown in FIG. 10. FIG. 10 is a table showing the contact definitions in step S4.

As shown in the first and second columns of FIG. 10, contacts of the front and back body parts to the human body model and the temporary model M3 are not defined. Thus, the front body part FM and the back body part BM are stretched without any contact constraints.

Furthermore, as shown in the third and fourth columns, contacts of the right and left sleeves to the human body are not defined, but contacts of the right and left sleeves to the temporary models M1 and M2 are defined. Therefore, the front body part FM and the back body part BM are stretched so that they are not wedged into the temporary models M1 and M2.

In the present embodiment, for the region where the temporary models M1 to M3 are wedged into the human body model, contact is defined such that the human body model takes priority. Such a process of stretching the paper pattern models can be realized by providing the contact definitions to the ABAQUS and defining the destinations of the node points.

Figures 11, 12:
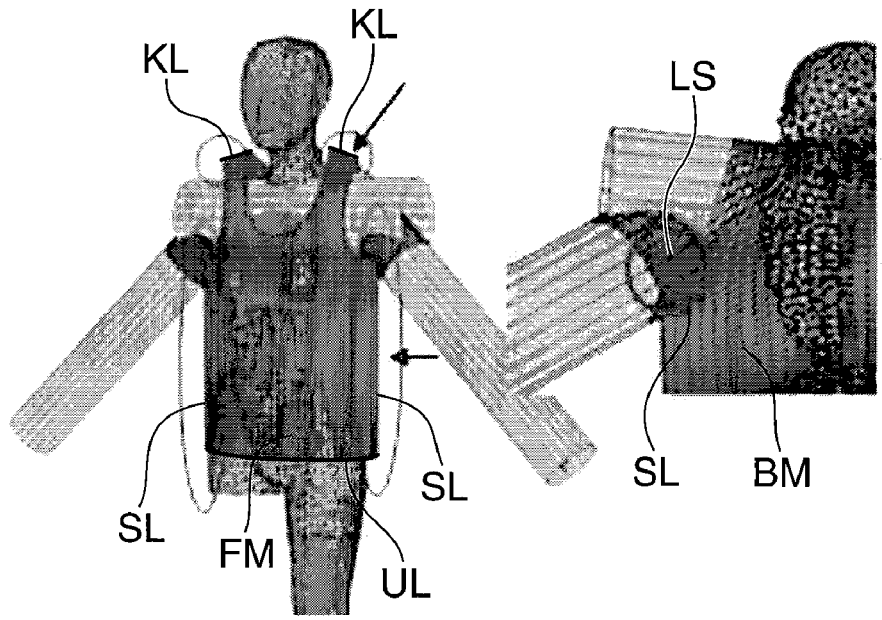
FIG. 11 is an explanatory diagram of step S5.
FIG. 12 is a table showing the contact definitions.

Next, as shown in FIG. 11, the fitting part 22 carries out a stitching process for connecting right and left shoulder lines KL of the front body part FM and right and left shoulder lines KL of the back body part, and also carries out a stitching process for connecting the right and left sidelines SL of the front body part FM and the right and left sidelines SL of the back body part (step S5).

Moreover, as shown in FIG. 11, the fitting part 22 further carries out a stitching process for stitching the sidelines SL of the left sleeve LS together, and further carries out a stitching process for stitching the sidelines of the right sleeve RS together (step S5). The detail of the stitching processes will be described later.

Here, the fitting part 22 carries out the stitching processes according to predefined contact definitions shown in FIG. 12. As shown in the first and second columns of FIG. 12, contacts of the front and back body parts to the human body model and the temporary model M3 are defined. Therefore, the stitching processes are carried out such that the front body part FM and the back body part BM are not wedged into the human body model and the temporary model M3.

As shown in the third and fourth columns of FIG. 12, contacts of the right and left sleeves to the human body model are not defined, but contacts of the right and left sleeves to the temporary models M1 and M2 are defined. Thus, the stitching processes are carried out such that the front body part FM and the back body part BM are not wedged into the temporary models M1 and M2.

Subsequently, the fitting part 22 executes a contact analysis process according to the contact definitions shown in FIG. 12 and deforms each of the paper pattern models (step S6). As shown in the first and second columns of FIG. 12, contacts of the front and back body parts to the human body model and the temporary model M3 are defined. Thus, the paper pattern models are deformed such that the front body part FM and the back body part BM come into contact with the human body model and the temporary model M3. Note that such a contact analysis process can be realized by providing the contact definitions to the ABAQUS. Moreover, in this case, an underline UL of the front body part FM and the back body part BM is confined.

As shown in the third and fourth columns, contacts of the right and left sleeves to the human body are not defined, but contacts of the right and left sleeves to the temporary models M1 and M2 are defined. Therefore, the paper pattern models are deformed such that the front body part FM and the back body part BM come into contact with the temporary models M1 and M2.

Figures 13, 14:
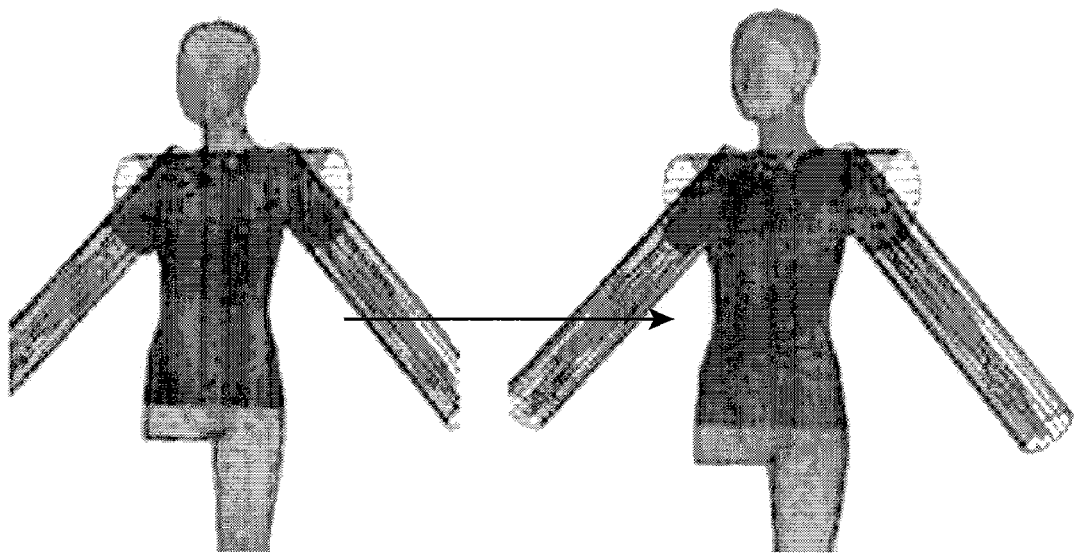
FIG. 13 is an explanatory of step S7.
FIG. 14 is a table showing the contact definitions.

The fitting part 22 then carries out a stitching process for connecting the left sleeve LS to the front body part FM and the back body part BM, and further performs the stitching process for connecting the right sleeve RS to the front body part FM and the back body part BM, as shown in FIG. 13 (step S7). Note that the left-hand side of FIG. 13 shows the state obtained prior to the stitching processes, and the right-hand side the state obtained after the stitching processes.

Here, the fitting part 22 executes the stitching processes according to the contact definitions shown in FIG. 14. As shown in the first and second columns of FIG. 14, contacts of the front and back body parts to the human body model and the temporary model M3 are defined. Hence, the stitching processes are carried out such that the front body part FM and the back body part BM are not wedged into the human body model and the temporary model M3.

In addition, as shown in the third and fourth columns of FIG. 14, contacts of the right and left sleeves to the human body model are defined, but contacts of the right and left sleeves to the temporary models M1 and M2 are not defined. Therefore, the stitching processes are carried out such that the front body part FM and the back body part BM are not wedged into the human body model.

Figures 15, 16:
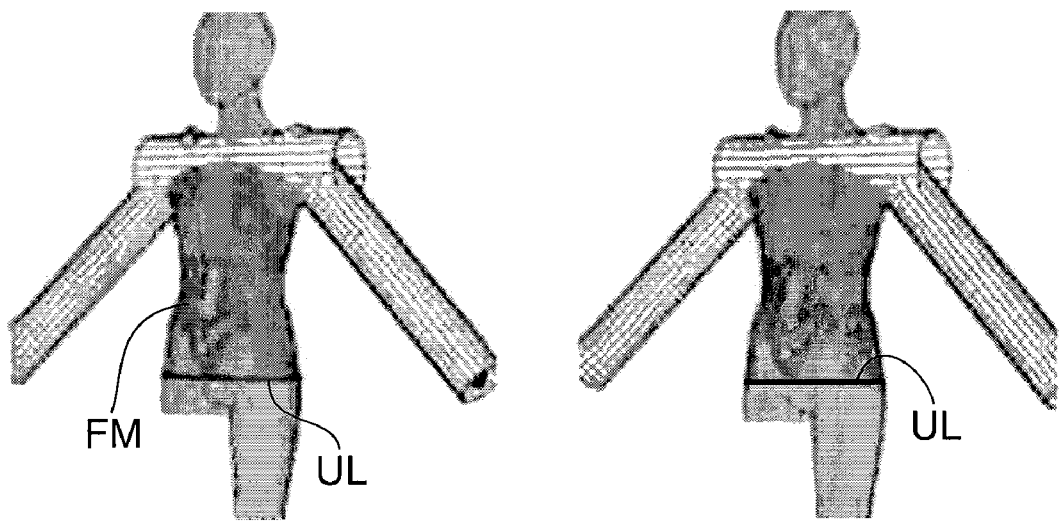
FIG. 15 is a table showing the contact definitions.
FIG. 16 is an explanatory diagram of step S9.

Next, the fitting part 22 executes the contact analysis process according to the contact definitions shown in FIG. 15 to deform each of the paper pattern models (step S8). As shown in the first and second columns of FIG. 15, contacts of the front and back body parts to the human body model are defined, but contacts of the front and back body parts to the temporary model M3 are not defined. For this reason, the paper pattern models are deformed such that the front body part FM and the back body part BM come into contact with the human body mode.

As shown in the third and fourth columns, contacts of the right and left sleeves to the human body model are defined, but contacts of the right and left sleeves to the temporary models M1 and M2 are not defined. Therefore, the paper pattern models are deformed such that the left sleeve LS and the right sleeve RS come into contact with the human body model.

Subsequently, the fitting part 22 releases the constraint that is set on the underline UL of the front body part FM and the back body part BM (step S9), as shown in FIG. 16. In this case, as in step S8, the fitting part 22 executes the contact analysis process in accordance with the contact definitions shown in FIG. 15 to deform the front body part FM and the back body part BM.

As shown in the first and second columns of FIG. 15, contacts of the front and back body parts to the human body model are defined, but contacts of the front and back body parts to the temporary model M3 are not defined. Thus, the paper pattern models are deformed such that the front body part FM and the back body part BM come into contact with the human body model.

As shown in the third and fourth lines of FIG. 15, contacts of the right and left sleeves to the human body model are defined, but contacts of the right and left sleeves to the temporary models M1 and M2 are not defined. Therefore, the paper pattern models are deformed such that the left sleeve LS and the right sleeve RS come into contact with the human body model. Note that the left-hand side of FIG. 16 shows the state obtained prior to releasing the constraint, and the right-hand side the state obtained after releasing the constraint. As shown in FIG. 16, the underline UL is moved upward by releasing the constraint.

Returning to FIG. 3, the clothing pressure calculation part 23 obtains the clothing pressure of each of the elements configuring the paper pattern model (step S10). In the ABAQUS, the force of each element is calculated, and consequently the clothing pressure can be calculated by dividing the force by the area of each element.

Figures 17, 18:
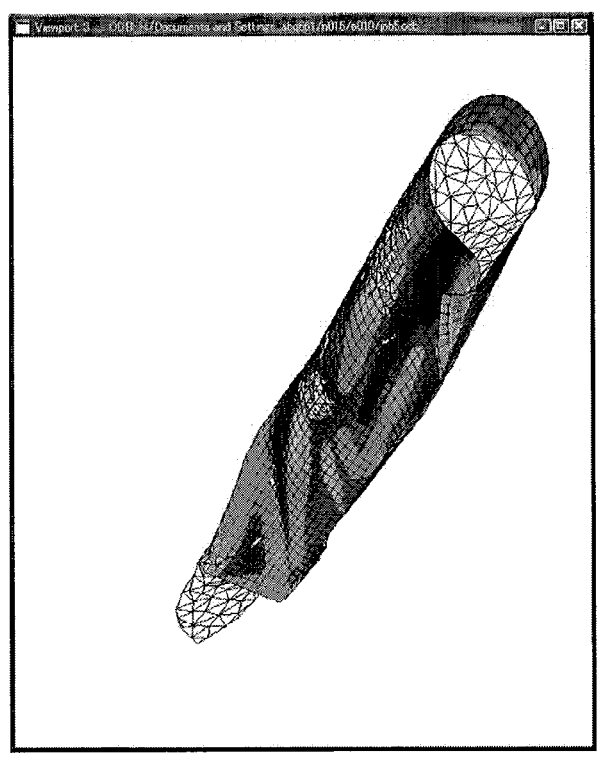
FIG. 17 is a table showing a summary of the contact definitions of steps S4 to S9.
FIG. 18 is a diagram showing a simulation result obtained when a left sleeve is fitted directly to the human body model without having the temporary model therebetween.

FIG. 17 is a table showing a summary of the contact definitions of steps S4 to S9. The numbers shown in the first column of FIG. 17 represent the step numbers. As shown in FIG. 17, contacts of the front and back body parts to the temporary model M3 are defined in steps S5 to S7. However, after step S8, contacts of the front and back body parts to the temporary model M3 are released, and contacts of the front and back body parts to only the human body model are defined.

Moreover, as shown in FIG. 17, contacts of the right and left sleeves to the temporary models M1 and M2 are defined in steps S4 to S6, and contacts of the right and left sleeves to only the human body model are defined after step S7.

In other words, each of the paper pattern models is deformed to come into contact with the temporary model M3 and thereafter deformed to come into contact with the human body model. As a result, each paper pattern model is deformed to come into contact with the human body model, while the generation of wrinkles is prevented.

FIG. 18 is a diagram showing a simulation result obtained when the left sleeve is fitted directly to the human body model without having the temporary model therebetween. In FIG. 18, the clothing pressure of the fabric is expressed by the brightness. In other words, the fabric swells and the clothing pressure thereof decreases at bright sections on the fabric. As shown in FIG. 18, a large number of wrinkles are generated when the left sleeve is fitted to the human body model without having the temporary model therebetween.

The stitching processes are now described. First, stitching points are set. For example, when stitching the front body part FM and the back body part BM together, each of the node points on the sidelines SL and each of the node points on the shoulder lines KL are set as the stitching points. Next, stitching node points of the back body part corresponding to stitching node points of the front body part FM are set. Hereinafter, this process is explained by way of example of a stitching node point F focused in the front body part FM and a stitching node point B of the back body part BM associated with the stitching node point F. Note that the stitching node points and association of the stitching node points are defined beforehand.

First of all, a dummy node point D is set as an initial position of the stitching node point B. Next, the amount of displacement Δd of the dummy node point D is obtained. Here, the amount of displacement Δd is expressed by the difference between the stitching node point F and the dummy node point D.

$$\Delta d = -(F-D)$$

Then, the amount of displacement Δf of the stitching node point F is obtained.

$$\Delta f = \Delta d/2 = -(F-D)/2$$

Then, a stitching node point F' is obtained after the stitching node point F is moved.

$$F' = F + \Delta f = (F+D)/2$$

Then, the amount of displacement Δb of the stitching node point B is obtained.

Here, the amount of displacement Δf, Δb, Δd of each of the stitching node points F, B and dummy node point D is constrained by the following multipoint constraint equation.

$$\Delta b + \Delta d - \Delta f = 0$$

Thus, Δb is expressed by the following formula.

$$\Delta b = \Delta f - \Delta d = \Delta d/2 - \Delta d = -\Delta d/2$$

Next, a stitching node point B' is obtained after the stitching node point B is moved.

$$B' = B + \Delta b = F + D = F'$$

As a result, the stitching node points F, B are moved to the same position. Thereafter, the stitching node points F', B' are moved according to the multipoint constraint equation mentioned above. However, Δd of the moved stitching node points F', B' becomes 0, and consequently a relationship where Δb=Δf is obtained from the multipoint constraint equation. As a result, the stitching node points F', B' are moved in a stacked manner.

The stitching processes can be realized by defining the contact definitions, stitching node points, dummy node point, multipoint constraint equation and the like in the ABAQUS.

Figure 19:
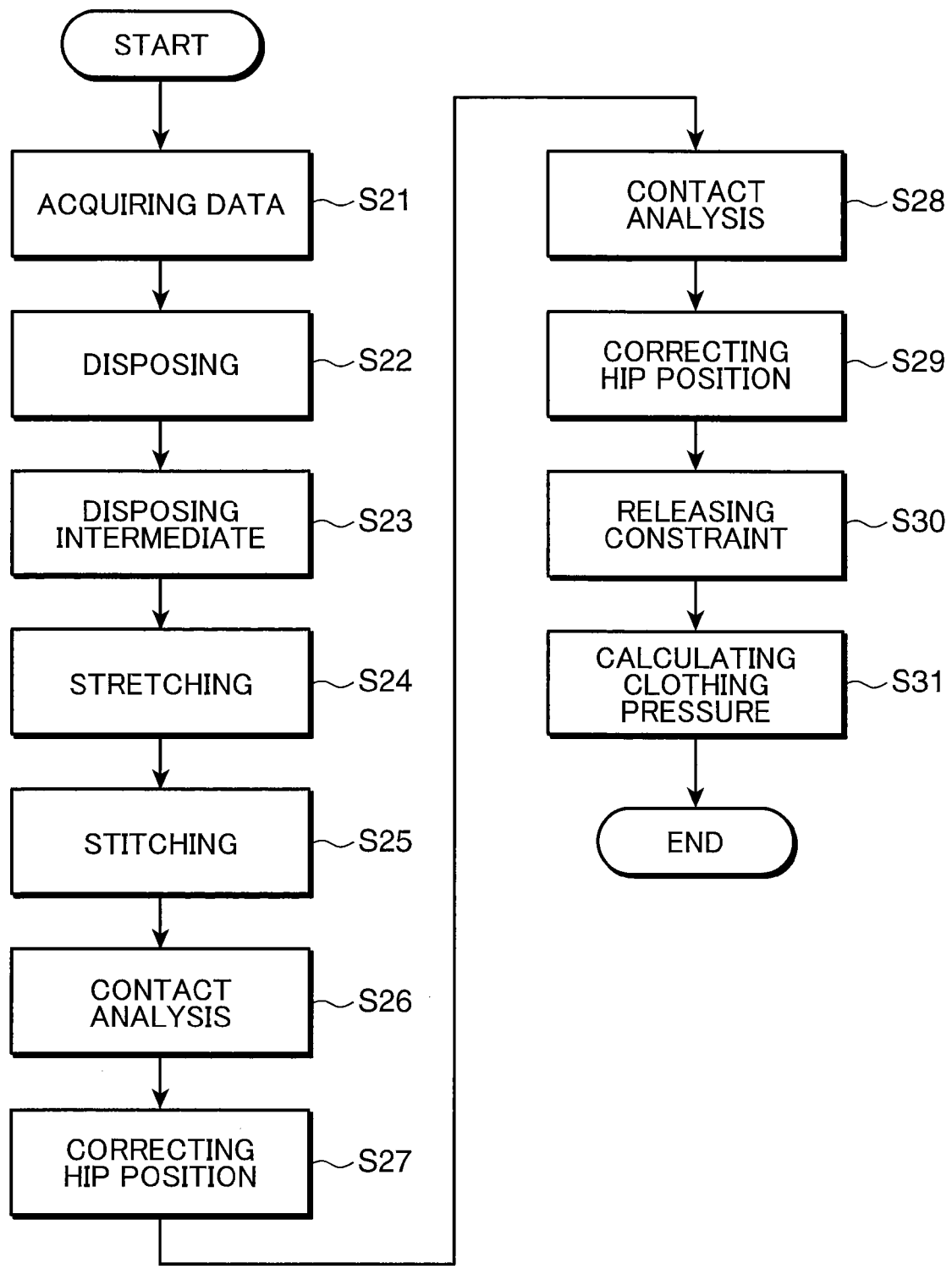
FIG. 19 is a flowchart showing operations of the clothing simulation apparatus that are performed when a pair of spats is adopted as the clothing.

Next is described the operations of the clothing simulation apparatus that are performed when a pair of spats, an example of a lower-body clothing, is adopted as the clothing. FIG. 19 is a flowchart showing the operations of the clothing simulation apparatus that are performed when the pair of spats is adopted as the clothing. First, the data acquisition part 21 acquires the human body model, paper pattern model and clothing model (step S21).

Figure 20:
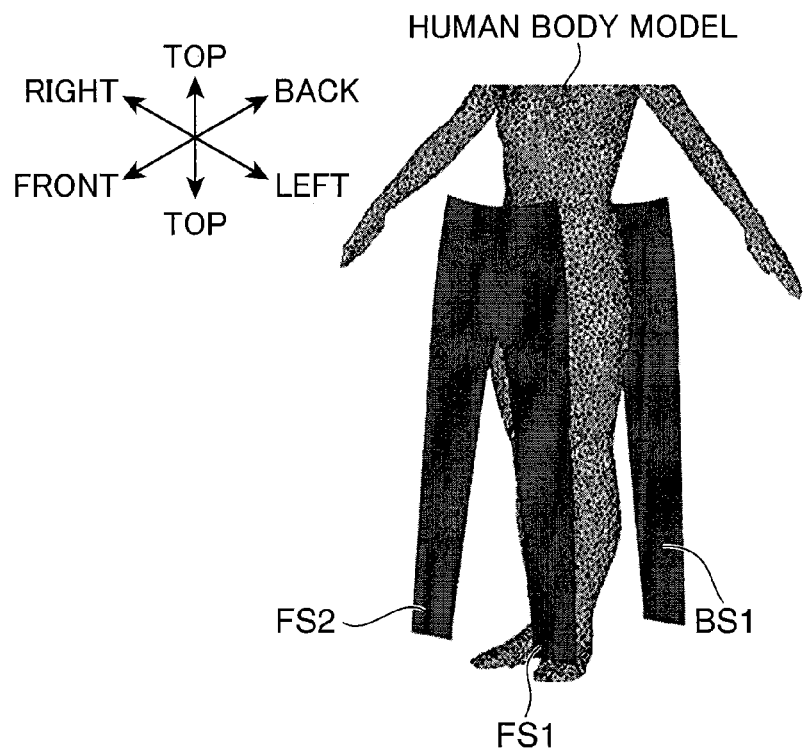
FIG. 20 is a diagram showing a human body model and paper pattern model disposed in a virtual three-dimensional space.

Next, the fitting part 22 disposes the human body model and the paper pattern model in predetermined initial positions within a virtual three-dimensional space (step S22). FIG. 20 is a diagram showing the human body model and the paper pattern model that are disposed within the virtual three-dimensional space. In this flowchart, the pair of spats is adopted as the clothing. Therefore, the paper pattern model includes four paper pattern models: a left leg front side pattern paper FS1, a right leg front side pattern paper FS2, a left leg back side pattern paper BS1, and a right leg back side pattern paper BS2.

As shown in FIG. 20, the pattern papers FS1, FS2 are disposed in positions that are located in front of the left leg and right leg of the human body model by a predetermined distance, and the pattern papers BS1, BS2 are disposed in positions that are located on the back of the left leg and right leg of the human body model by a predetermined distance.

Figure 21:
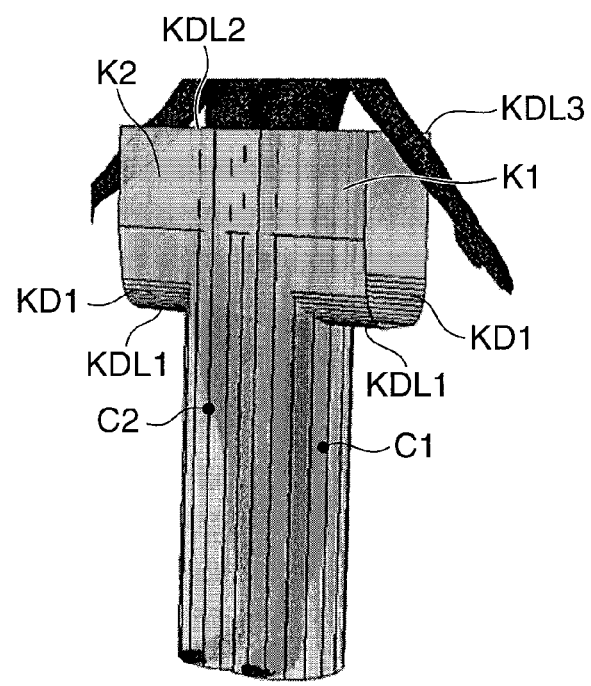
FIG. 21 is a diagram showing the human body model having a temporary model disposed therein.

The fitting part 22 then disposes the temporary model in a predetermined initial position within the virtual three-dimensional space (step S23). FIG. 21 is a diagram showing the human body model having the temporary model disposed therein. As shown in FIG. 21, the temporary model includes four temporary models: a cylinder C1 that is disposed to cover the entire left leg, a cylinder C2 that is disposed to cover the entire right leg, and a left saddle body K1 that is disposed on the left side of the hip such that a ridge line KDL1 is laid in parallel to a horizontal direction of the human body model and faces the legs, and a right saddle body K2.

Specifically, the cylinders C1 and C2 are disposed such that a lower end of each cylinder is positioned at the toes and an upper end is positioned in the vicinity of a waistline. The cylinder C1 is disposed such that a long axis thereof overlaps with a straight line connecting a left trochanter point and the arch of the left foot. The cylinder C2 is disposed such that a long axis thereof overlaps with a straight line connecting a right trochanter point and the arch of the right foot. In addition, as the length of the diameter of each of the cylinders C1, C2, the length of the diameter of a circle that is larger than the maximum cross-sectional area of each foot can be adopted.

The saddle body K1 has a curved part KD1 and is disposed such that the ridge line KDL1 passes through the crotch or a section slightly lower than the crotch and is laid in parallel to the horizontal direction. Furthermore, the saddle body K1 is disposed such that a front edge KDL2 and back edge KDL3 are laid in parallel to a bust line. The saddle body K2 is disposed in continuity with the saddle body K1 and on the right-hand side of the saddle body K1. Moreover, in the saddle body K1 the right-hand side of the curved part KD1 is wedged into the cylinder C1, and in the saddle body K2 the left-hand side of the curved part KD1 is wedged into the cylinder C2.

Figures 22, 23:
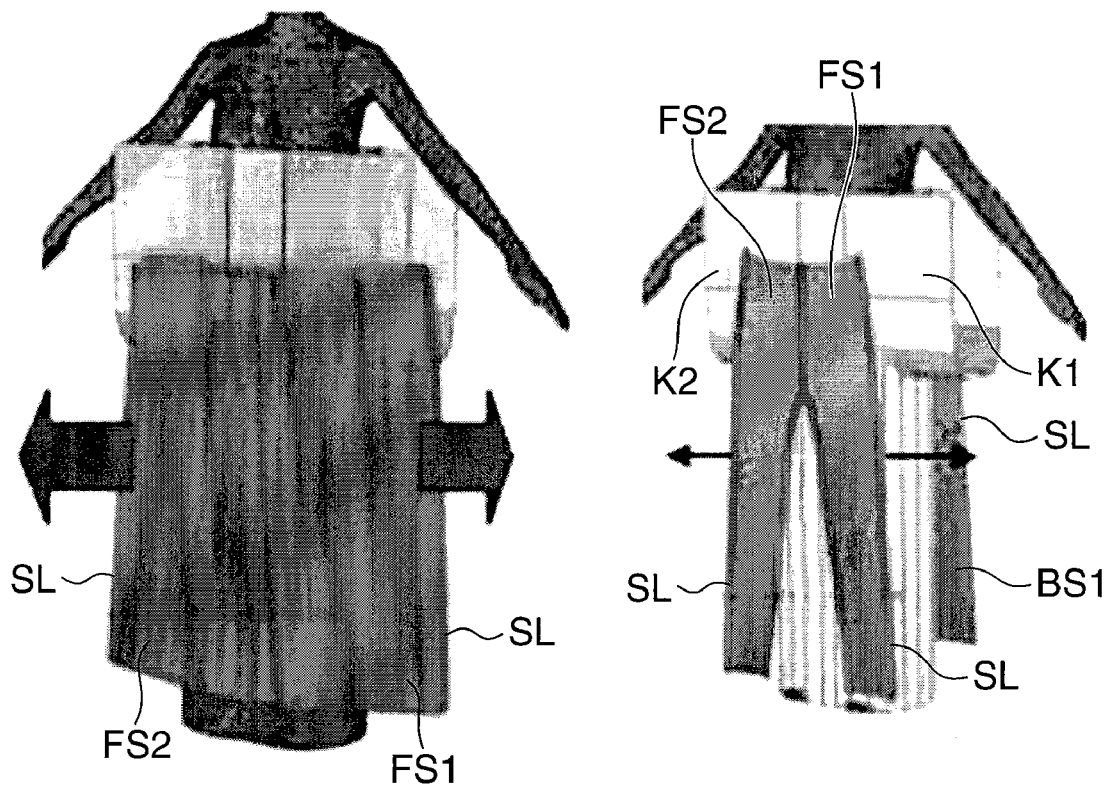
FIG. 22 is an explanatory diagram of step S24.
FIG. 23 is a table showing the contact definitions.

Next, the fitting part 22 imparts the dynamic characteristics shown by the fabric model to the node points between the paper pattern models and applies a predetermined external force thereto. As shown in FIG. 22, the pattern paper FS1 is stretched to the left so that a sideline SL of the pattern paper FS1 is positioned slightly in front of a left end of the saddle body K1 (step S24). Also, as shown in FIG. 22, the pattern paper FS2 is stretched to the right such that a sideline SL of the pattern paper FS2 is positioned slightly in front of a right end of the saddle body K2 (step S24).

As shown in FIG. 22, the pattern paper BS1 is stretched to the left such that a sideline SL of the pattern paper BS1 is positioned slightly behind the left end of the saddle body K1 (step S24). Moreover, as shown in FIG. 22, the pattern paper BS2 is stretched to the right such that a sideline SL of the pattern paper BS2 is positioned slightly behind the right end of the saddle body K2 (step S24).

Here, the fitting part 22 stretches each paper pattern model in accordance with predefined contact definitions shown in FIG. 23. FIG. 23 is a table showing the contact definitions of step S24.

As shown in FIG. 23, contacts of the pattern papers FS1, FS2 and the pattern papers BS1, BS2 to the human body model, cylinders C1, C2 and saddle bodies K1, K2 are not defined. Thus, the pattern papers FS1, FS2 and the pattern papers BS1, BS2 are stretched without any contact constraints.

Such a process of stretching the paper pattern models can be realized by providing the contact definitions to the ABAQUS and defining the destinations of the node points.

Figures 24, 25:
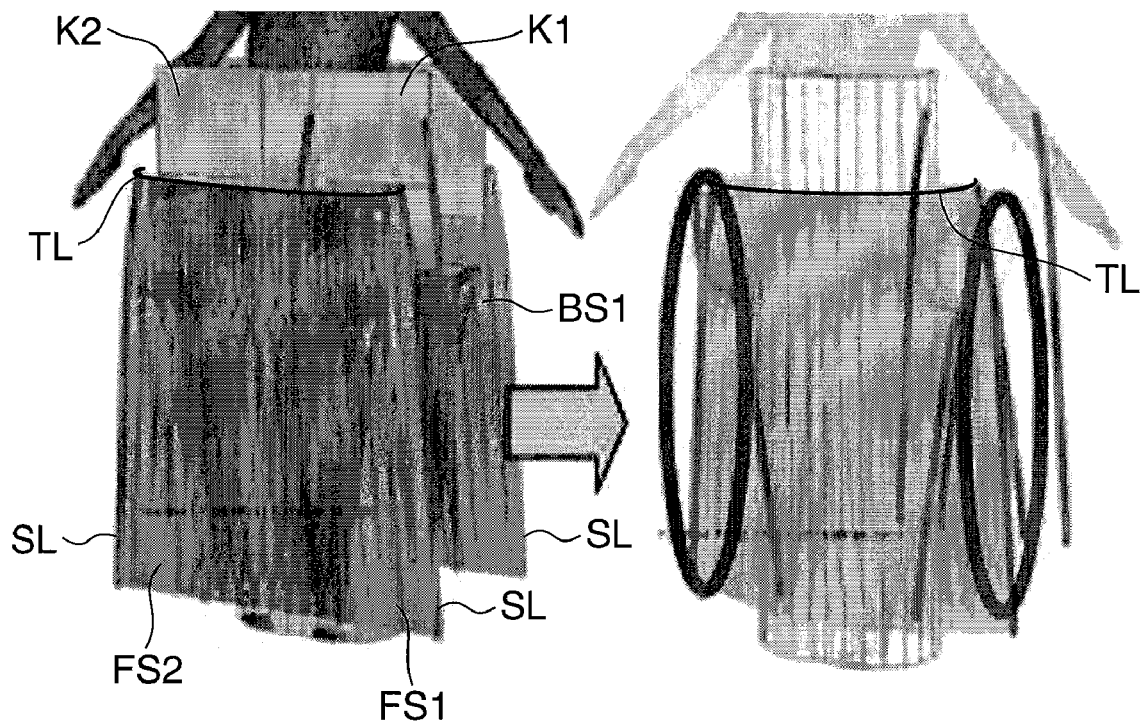
FIG. 24 is an explanatory diagram of step S25.
FIG. 25 is a table showing the contact definitions.

Next, as shown in FIG. 24, the fitting part 22 carries out a stitching process for connecting the sideline SL of the pattern paper FS1 to the sideline SL of the pattern paper BS1 and connecting the sideline SL of the pattern paper FS2 to the sideline SL of the pattern paper BS2 (step S25).

Here, the fitting part 22 carries out the stitching process in accordance with predefined contact definitions shown in FIG. 25. As shown in FIG. 25, contacts of the pattern papers FS1, FS2 and the pattern papers BS1, BS2 to the human body model are not defined, but contacts of the pattern papers FS1, FS2 and the pattern papers BS1, BS2 to the cylinders C1, C2 and the saddle bodies K1, K2 are defined. Thus, the stitching process is carried out such that the pattern papers FS1, FS2 and the pattern papers BS1, BS2 are not wedged into the cylinders C1, C2 and the saddle bodies K1, K2.

Figures 26, 27:
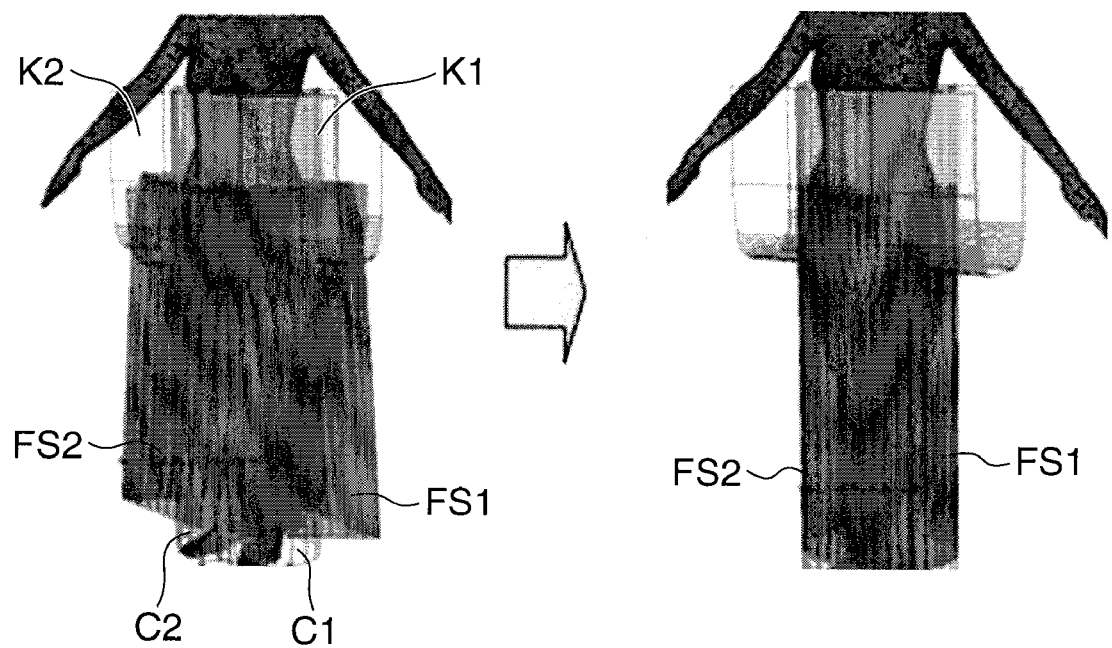
FIG. 26 is a table showing the contact definitions.
FIG. 27 is an explanatory diagram of step S26.

Subsequently, the fitting part 22 executes a contact analysis process according to the contact definitions shown in FIG. 26 and deforms each of the paper pattern models (step S26). As shown in FIG. 26, contacts of the pattern papers FS1, FS2 and the pattern papers BS1, BS2 to the human body model are not defined, but contacts of the pattern papers FS1, FS2 and the pattern papers BS1, BS2 to the cylinders C1, C2 and the saddle bodies K1, K2 are defined. Therefore, the pattern papers FS1, FS2 and the pattern papers BS1, BS2 are deformed to come into contact with the cylinders C1, C2 and the saddle bodies K1, K2. Note in step S26 that a top line TL and underline UL of the pattern papers FS1, FS2, BS1, BS2 are constrained.

FIG. 27 is an explanatory diagram of step S26. The left-hand side of FIG. 27 shows the state obtained prior to the process, and the right-hand side the state obtained after the process. In this case, as shown in FIG. 27, each of the paper pattern models is deformed to come into contact with the cylinders C1, C2 and the saddle bodies K1, K2.

Figures 28, 29:
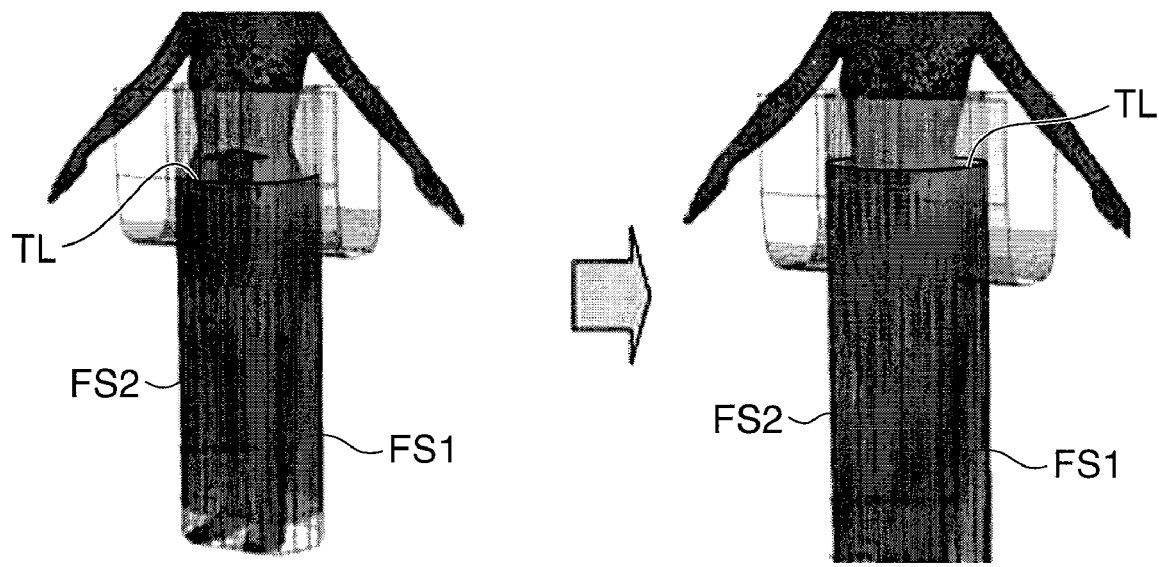
FIG. 28 is an explanatory diagram of step S27.
FIG. 29 is a table showing the contact definitions.

Next, the fitting part 22 carries out a hip position correction process for stretching the top line TL of the pattern papers FS1, FS2, BS1, BS2 to a predetermined upper position (step S27), as shown in FIG. 28. Note that the left-hand side of FIG. 28 shows the state obtained prior to the correction process, and the right-hand side the state obtained after the correction process.

Here, as with step S26, the fitting part 22 executes the hip position correction process in accordance with the contact definitions shown in FIG. 26. Hence, the hip position correction process is performed such that the pattern papers FS1, FS2, BS1, BS2 are not wedged into the cylinders C1, C2 and the saddle bodies K1, K2. Such a hip position correction process can be realized by defining contact using the ABAQUS.

Subsequently, the fitting part 22 executes the contact analysis process in accordance with the contact definitions shown in FIG. 29 to deform each of the paper pattern models (step S28). As shown in FIG. 29, contacts of the pattern papers FS1, FS2, BS1, BS2 to the human body model are defined, but contacts of the pattern papers FS1, FS2, BS1, BS2 to the cylinders C1, C2 and the saddle bodies K1, K2 are not defined. Therefore, the pattern papers FS1, FS2, BS1, BS2 are deformed to come into contact with the human body model. Note in step S28 that the top line TL and underline UL are constrained.

Figure 30:
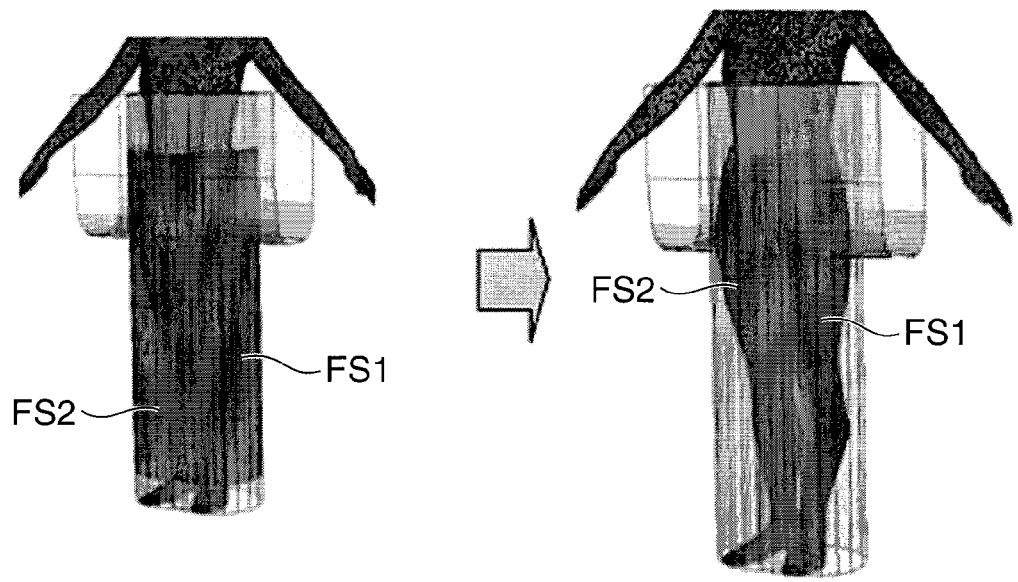
FIG. 30 is an explanatory diagram of step S28.

FIG. 30 is an explanatory diagram of step S28. The left-hand side of FIG. 30 shows the state obtained prior to the process, and the right-hand side the state obtained after the process. In this case, as shown in FIG. 30, each of the paper pattern models is deformed to come into contact with the human body model.

Figure 31:
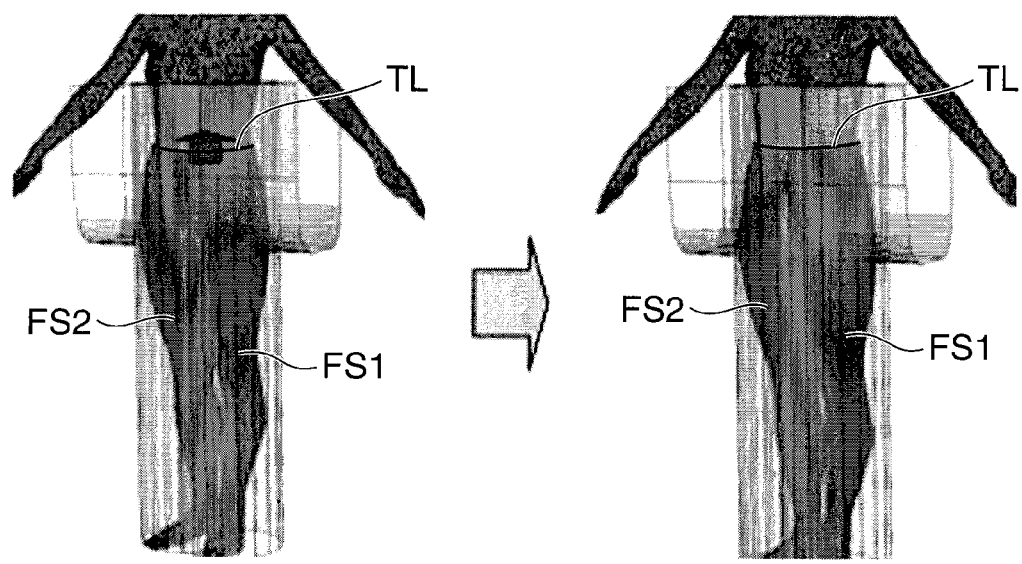
FIG. 31 is an explanatory diagram of step S29.

Next, the fitting part 22 further performs the hip position correction process for stretching the top line TL of the pattern papers FS1, FS2, BS1, BS2 to a predetermined upper position (step S29), as shown in FIG. 31. The left-hand side of FIG. 31 shows the state obtained prior to the correction process, and the right-hand side the state obtained after the correction process. In this case, as with step S28, the fitting part 22 executes the hip position correction process again in accordance with the contact definitions shown in FIG. 29. Therefore, the hip position correction process is carried out such that the pattern papers FS1, FS2, BS1, BS2 are not wedged into the human body model.

Figures 32, 33:
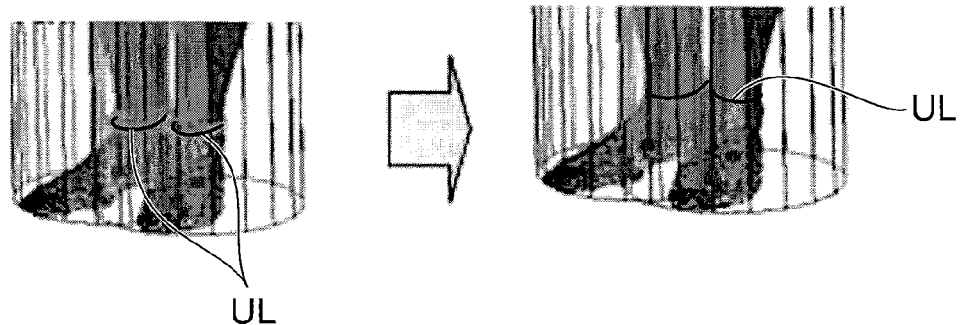
FIG. 32 is an explanatory diagram of step S30.
FIG. 33 is a table showing a summary of the contact definitions of steps S24 to S30.

Next, as shown in FIG. 32, the fitting part 22 releases the constraint that is set on the underline UL of the pattern papers FS1, FS2, BS1, BS2 (step S30). Note that the left-hand side of FIG. 32 shows the state prior to releasing the constraint, and the right-hand side the state obtained after releasing the constraint. In this case, as with step S28, the fitting part 22 releases the constraint in accordance with the contact definitions shown in FIG. 29. Thus, the pattern papers FS1, FS2, BS1, BS2 are deformed so as not to be wedged into the human body model. By releasing the constraint as shown in FIG. 32, the underline UL is moved upward.

The explanation of step S31 is omitted as it is the same as that of step S10.

FIG. 33 is a table showing a summary of the contact definitions of steps S24 to S30. The numbers shown in the first column of FIG. 33 represent the step numbers. As shown in FIG. 33, contacts of the pattern papers FS1, FS2, BS1, BS2 to the cylinders C1, C2 and the saddle bodies K1, K2 are defined in steps S25 to S27. However, after step S28, the definitions of contacts of the pattern papers FS1, FS2, BS1, BS2 to the cylinders C1, C2 and the saddle bodies K1, K2 are released, and contacts of the pattern papers FS1, FS2, BS1, BS2 to only the human body are defined.

In other words, each of the paper pattern models is deformed to come into contact with the temporary model configured by the cylinders C1, C2 and the saddle bodies K1, K2, and thereafter deformed to come into contact with the human body model. As a result, each paper pattern model is deformed to come into contact with the human body model, while the generation of wrinkles is prevented.

In the above description, a T-shirt and a pair of spats are used as the clothing, but swimwear, leotards, stockings, underwear, tights, supporters, sportswear, or other clothing may be adopted. For the T-shirt, a long-sleeve T-shirt or short-sleeve T-shirt may be used. Moreover, short spats may be used as the pair of spats.

A tank top may be adopted in place of the T-shirt. In this case, the paper pattern model of the tank top is configured by a front body part and back body part and has no sleeves. Therefore, only the temporary model M3 may be set and the temporary models M1 and M2 may be omitted.

In addition, the paper pattern model of the pair of spats is configured by the four pattern papers for the left leg front side, right leg front side, left leg back side, and right leg back side. However, the paper pattern model of the pair of spats is not limited thereto. One pattern paper may be used for configuring the front and back pattern papers of the left leg, and one pattern paper may be used for configuring the front and back pattern papers of the right leg.

A human body model with bent knees or a human body model with bent elbows may be adopted. In this case, a cylindrical temporary model that is bent in accordance with the bend of the elbows and knees may be adopted. In this manner, the clothing pressure generated when the knees and elbows are bent can be calculated.

As the temporary models, not only the cylinder or saddle bodies but also the one with a smoothly-curved surface may be adopted. For example, a temporary model in the shape of an ellipsoidal body, a polygonal pyramid such as a triangular pyramid and square pyramid, or a circular cone may be adopted.

Embodiment

The experimental results obtained by the present invention are now described. In the following experiment, a T-shirt was adopted as the clothing. For the materials of the T-shirt, a black KSD5980D (case 1), a blue XLA7W533W (case 2), and a material obtained by stitching the XLA7W533 and KSD5980D (case 3) were used. In the case 3, the central part of the back body part was configured by the XLA7W533W, and the KSD5980D was used to sandwich both sides of the central part. The front body part and the right and left sleeves were configured by the KSD5980D.

An analytical value of the clothing pressure obtained by the clothing simulation apparatus was compared with a measurement value of the clothing pressure obtained by a pressure sensor.

Figure 34:
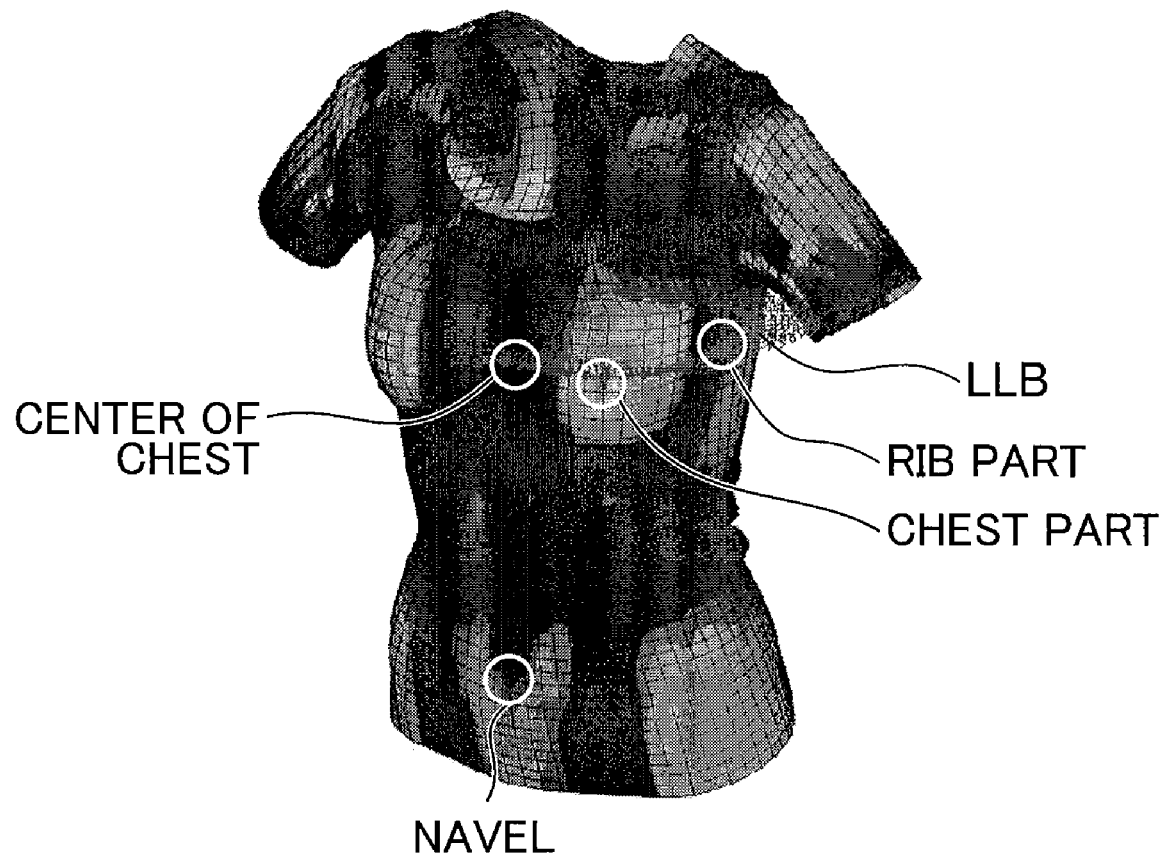
FIG. 34 is a diagram showing a clothing pressure measurement section.

As a result, the following experimental result was obtained. FIG. 34 is a diagram showing a clothing pressure measurement section. FIG. 35 is a table showing the experimental result, wherein (a) to (c) show the case 1 to case 3 respectively.

In FIG. 35, each measurement value represents an true measurement value of the clothing pressure obtained by the pressure sensor. Each analytical value represents an analytical value of the clothing pressure obtained by the clothing simulation apparatus. In this experiment, a chest part, rib part and navel shown in FIG. 34 were measured for each of the cases 1 to 3.

As shown in FIG. 35, the analytical values of these parts were close to the measurement values in all of the cases 1 to 3, thus a good simulation result was obtained.

Figure 36:
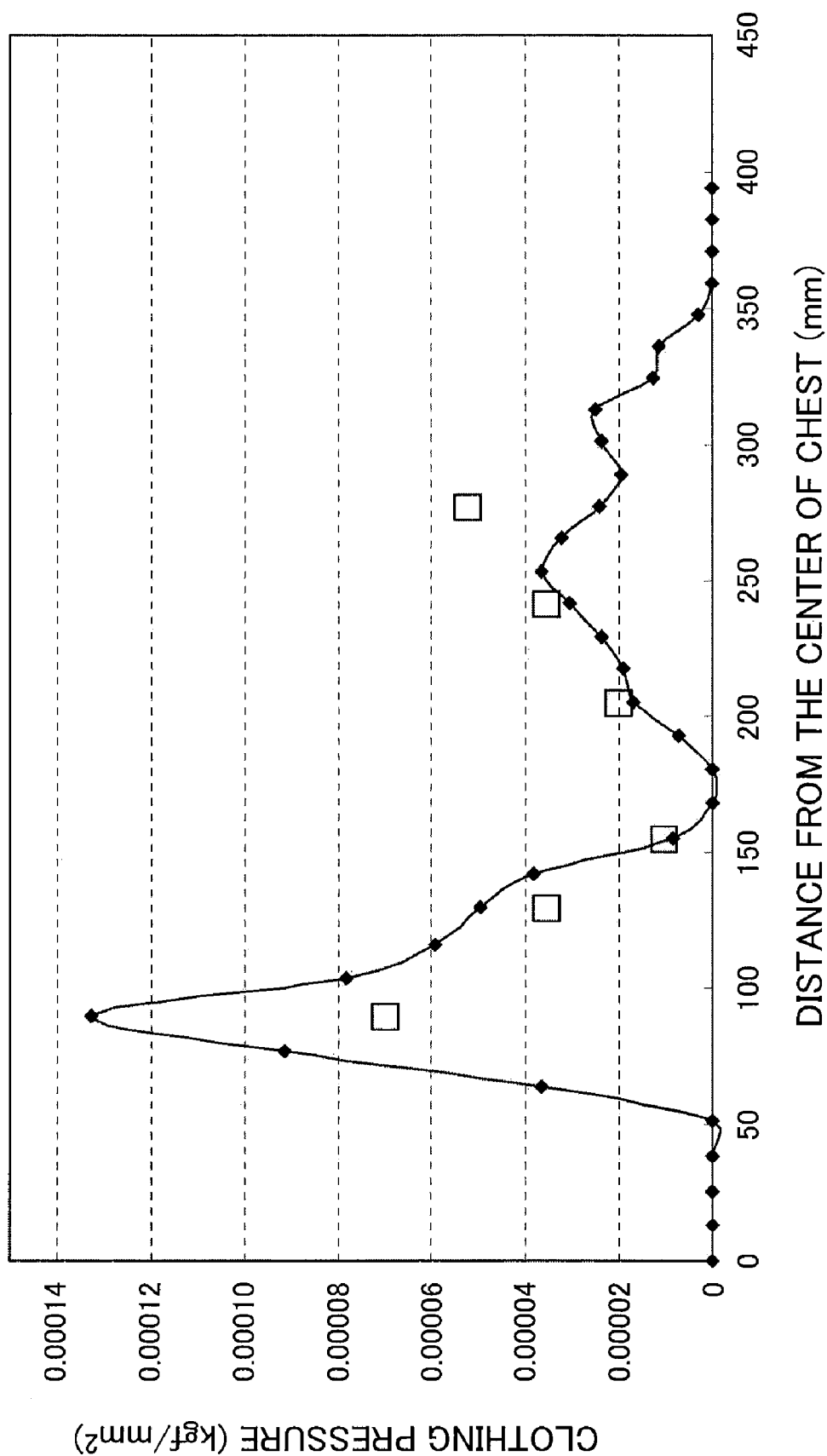
FIG. 36 is a graph showing the analytical values and true measurement values obtained on a bust line LLB in case 1.
Figure 37:
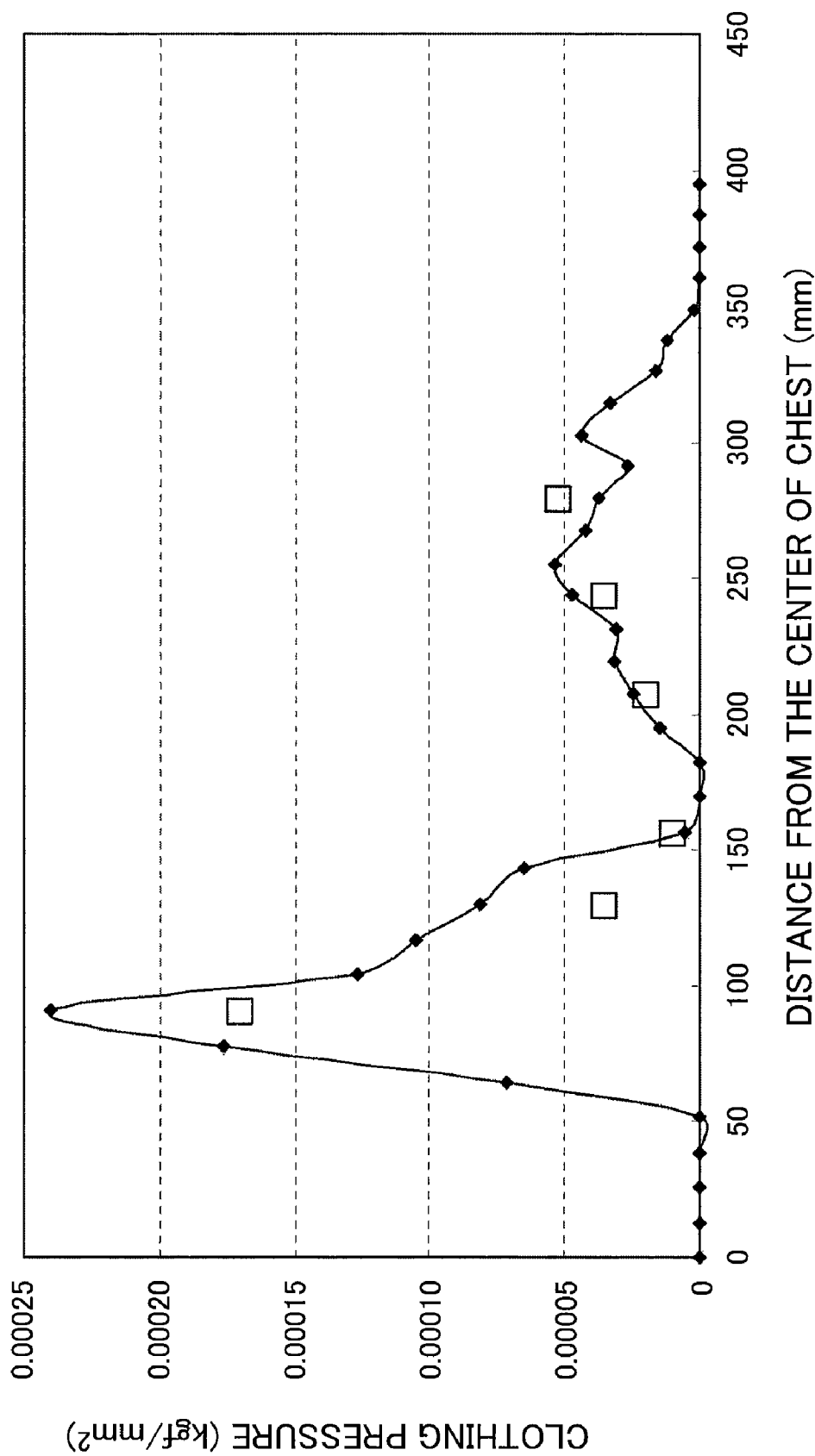
FIG. 37 is a graph showing the analytical values and true measurement values obtained on the bust line LLB in case 2.
Figure 38:
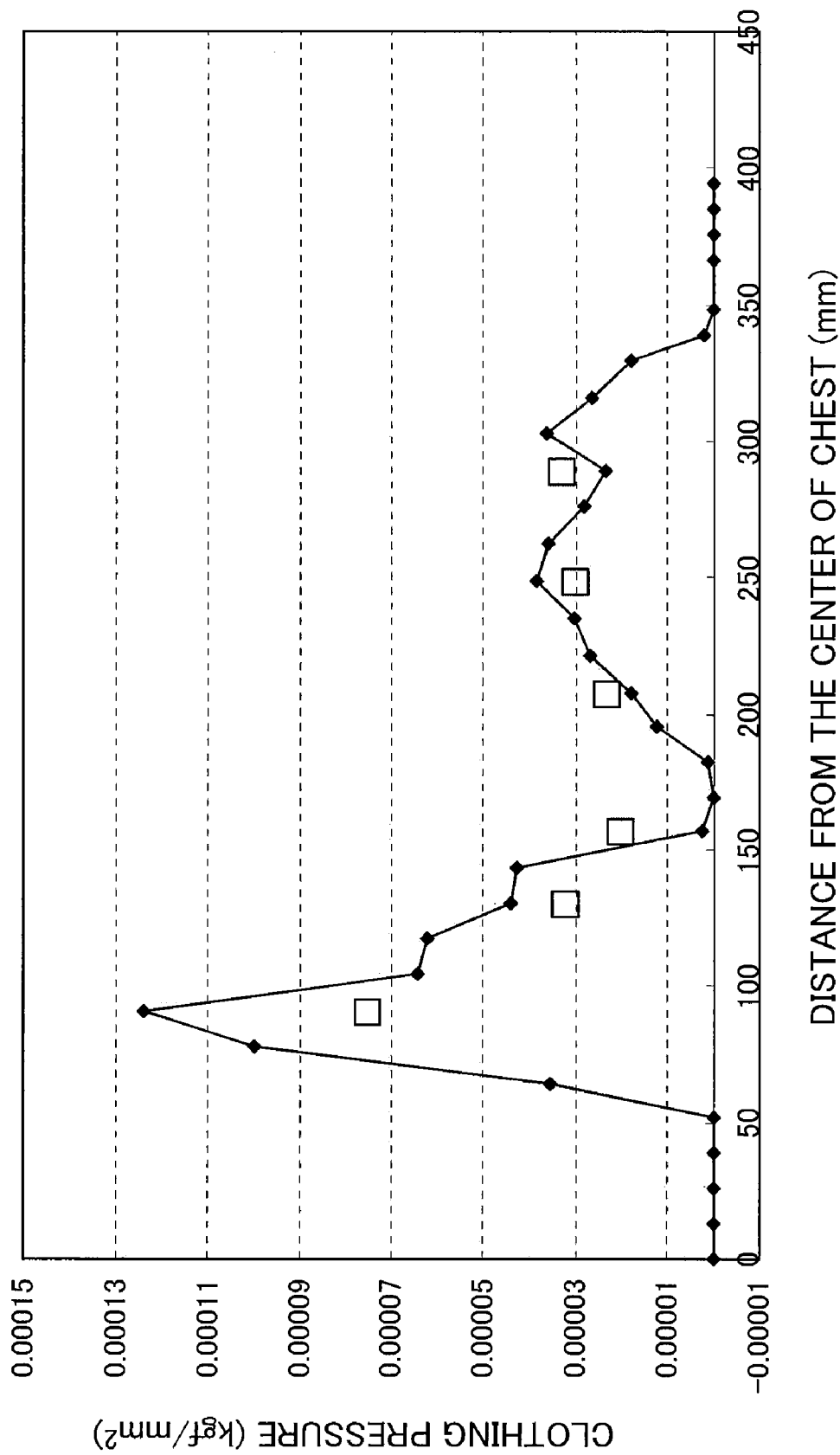
FIG. 38 is a graph showing the analytical values and true measurement values obtained on the bust line LLB in case 3.

FIGS. 36 to 38 are graphs showing the analytical values and measurement values obtained on a bust line LLB shown in FIG. 34 for the cases 1 to 3. In each of the graphs of FIGS. 36 to 38, the vertical axis represents the clothing pressure (kgf/mm$^2$), and the horizontal axis the distance (mm) to each position on the bust line LLB when the center of the chest is 0. Also, the black squares are the analytical values, and the white squares the measurement values. As is clear from the graphs of FIGS. 36 to 38, the analytical values are close to the measurement values, thus a good simulation result was obtained.

Figure 39:
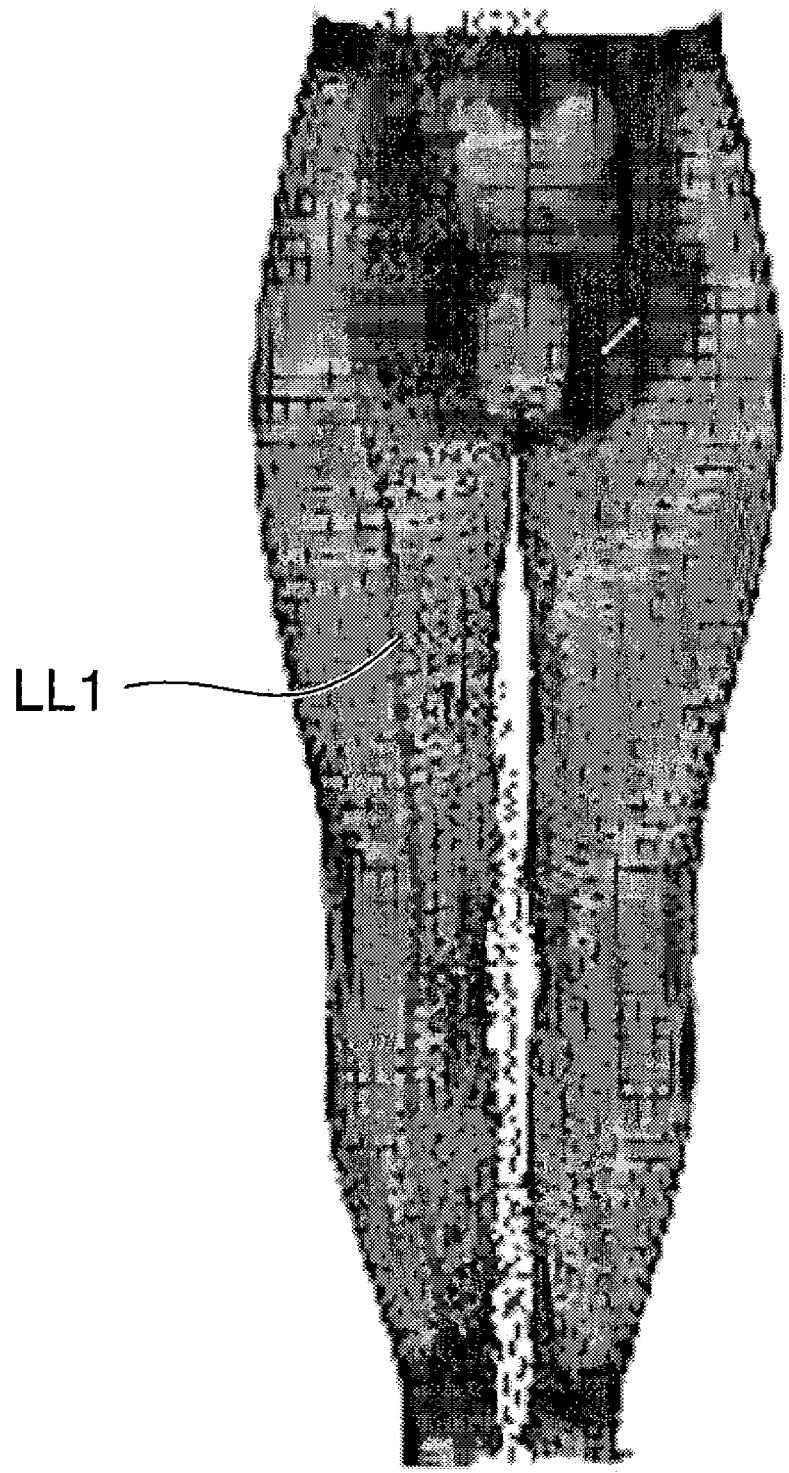
FIG. 39 is a diagram showing a clothing pressure measurement section for the case where a pair of spats is adopted as the clothing.
Figure 40:
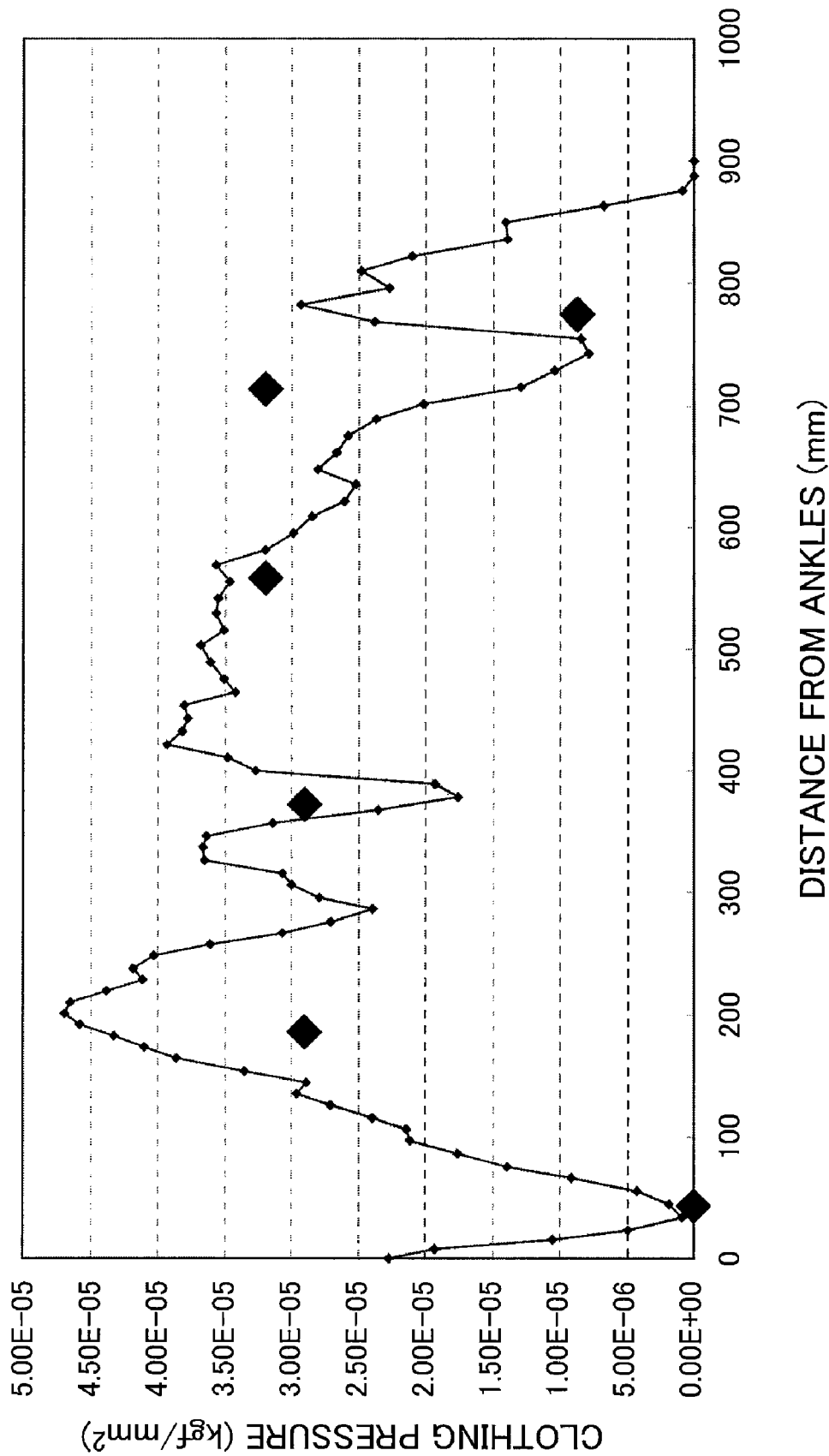
FIG. 40 is a graph showing experimental results obtained when the pair of spats is adopted as the clothing.
Figure 41:
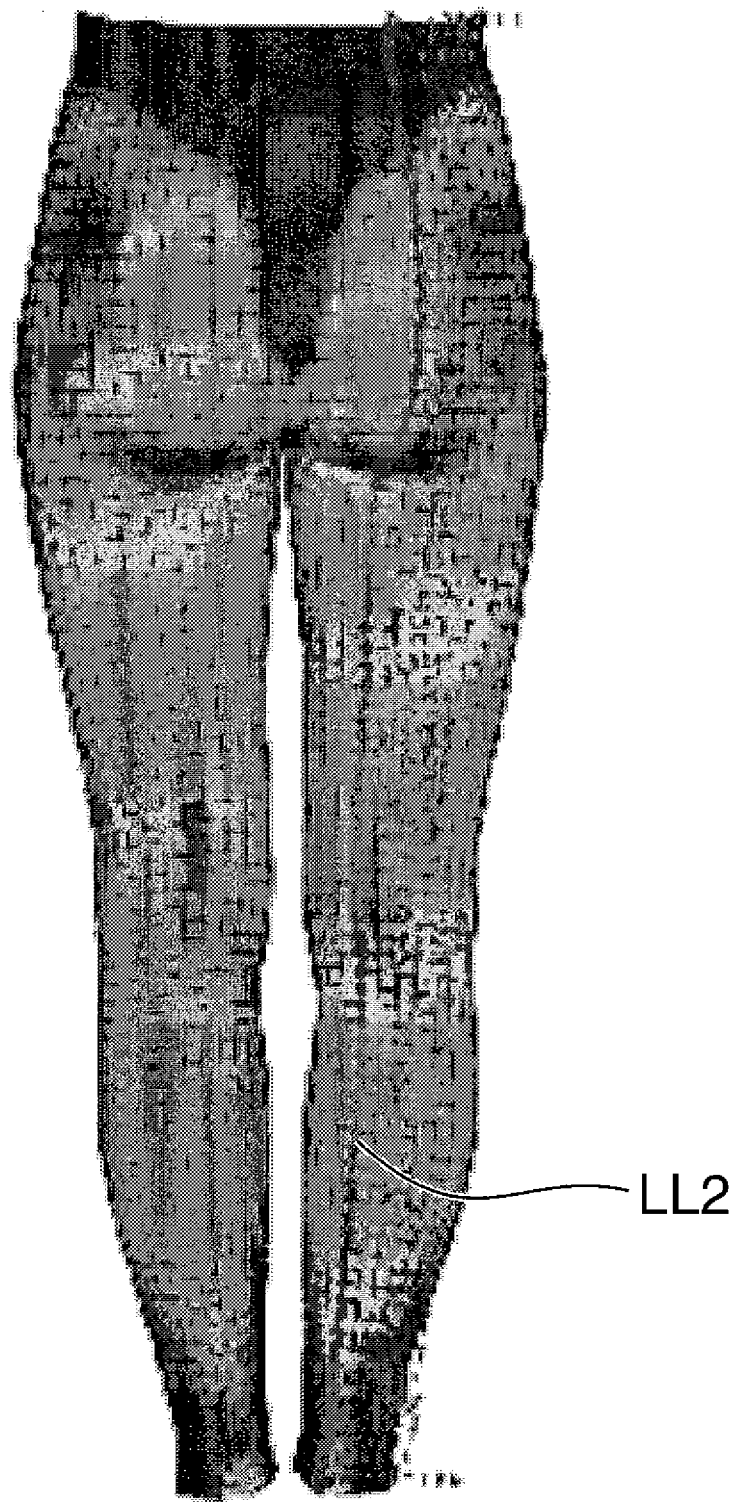
FIG. 41 is a diagram showing a clothing pressure measurement section for the case where the pair of spats is used as the clothing.
Figure 42:
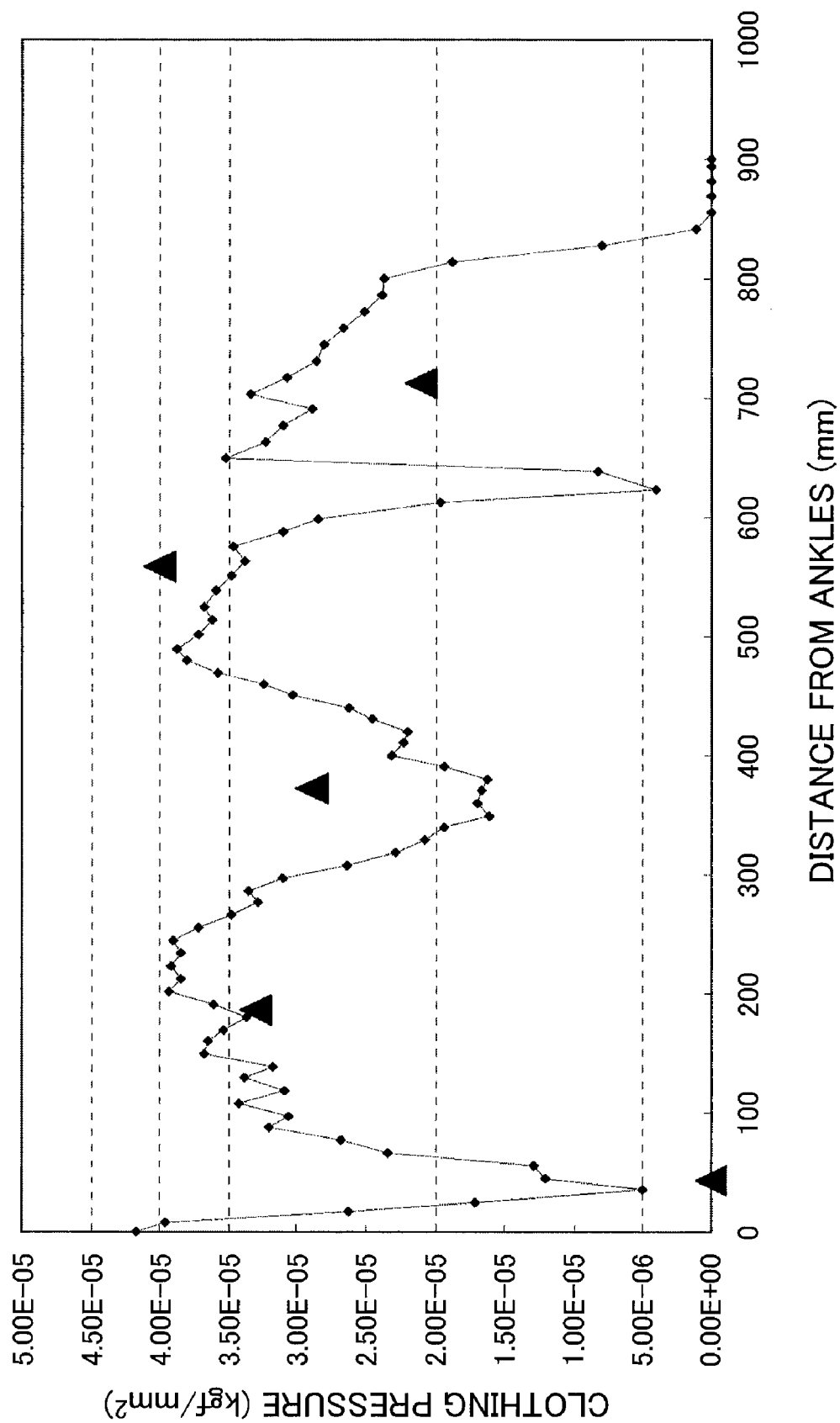
FIG. 42 is a graph showing experimental results obtained when the pair of spats is used as the clothing.

Additionally, a pair of spats was used as the clothing to perform an experiment similar to that on the T-shirt. In this case, the following experimental result was obtained. FIGS. 39 and 41 are diagrams showing a clothing pressure measurement section for the case where the pair of spats is used as the clothing. FIGS. 40 and 42 are graphs showing the experimental result obtained when the pair of spats is used as the clothing.

FIG. 40 shows the analytical values and measurement values obtained on a measurement line LL1 that connects the front side of the right ankle shown in FIG. 39 and the hip. Moreover, FIG. 42 shows the analytical values and measurement values obtained on a measurement line LL2 that connects the back side of the right angle shown in FIG. 41 and the hip. In each of FIGS. 40 and 42, the vertical axis represents the clothing pressure (kgf/mm$^2$), and the horizontal axis the distance to each position on the measurement lines LL1, LL2 when the position of the ankle is 0. The triangles are the measurement values obtained by the pressure sensor, and the squares the analytical values.

As is clear from the FIGS. 40 and 42, in the case of the pair of spats, as with the case of the T-shirt, the analytical values are close to measurement, values, thus a good simulation result was obtained.

The invention claimed is:

1. A clothing simulation apparatus, comprising:
human body model acquisition part for acquiring a human body model showing a three-dimensional shape of a human body;
paper pattern model acquisition part for acquiring a paper pattern model showing a two-dimensional shape of a pattern paper of a clothing that is fitted virtually to the human body model;
fabric model acquisition part for acquiring a fabric model showing dynamic characteristics of a fabric configuring the clothing;
fitting part for dividing the paper pattern model into a plurality of elements, imparting the dynamic characteristics shown by the fabric model to each element, deforming the paper pattern model by solving a motion equation of each element using a finite element method, and then fitting the clothing virtually to the human body model; and
clothing pressure calculation part for calculating a clothing pressure that is virtually applied to the human body model by the clothing fitted by the fitting part,
wherein the fitting part sets a temporary model that is formed so as to cover a predetermined section of the human body model, deforms the paper pattern model to bring the paper pattern model into contact with the temporary model, and thereafter deforms the paper pattern model to bring the paper pattern model into contact with the human body model.

2. The clothing simulation apparatus according to claim 1, wherein
the fabric model simulates a shell river structure configured by a base material, a longitude river arrayed in a longitudinal direction within the base material to reinforce the base material, and a latitude river arrayed in a latitudinal direction within the base material to reinforce the base material,
the fabric model expresses the rigidity of the fabric using a base material rigid component showing the rigidity of the base material, a longitude river rigid component showing the rigidity of the longitude river, and a latitude rigid component showing the rigidity of the latitude river,
the base material rigid component is calculated based on the rigidity in a bias direction of an true fabric,
the longitude river rigid component is applied with a difference between the rigidity in a longitudinal direction of the true fabric and the base material rigid component, and
the latitude river rigid component is applied with a difference between the rigidity in a latitudinal direction of the true fabric and the base material rigid component.

3. The clothing simulation apparatus according to claim 2, wherein the base material rigid component is calculated based on a function of strain energy generated by superelasticity.

4. The clothing simulation apparatus according to claim 1, wherein the temporary model has a smoothly-curved surface.

5. The clothing simulation apparatus according to claim 4, wherein the temporary model is in the shape of a cylinder, an ellipsoidal body, a saddle, a polygonal pyramid or a circular cone.

6. The clothing simulation apparatus according to claim 1, wherein
the clothing is an upper-body clothing,
the paper pattern model includes paper pattern models for a front body part, back body part, left sleeve and right sleeve, and
the fitting part sets a cylindrical temporary model on a left arm and right arm of the human body and sets the cylindrical temporary model such that an axial direction thereof follows a straight line connecting both shoulders of the human body.

7. The clothing simulation apparatus according to claim 1, wherein
the clothing is an upper-body clothing,
the paper pattern model includes paper pattern models for a front body part and back body part, and
the fitting part sets a cylindrical temporary model such that an axial direction thereof follows a straight line connecting both shoulders of the human body model.

8. The clothing simulation apparatus according to claim 1, wherein
the clothing is a lower-body clothing,
the paper pattern model includes paper pattern models for a left leg and right leg, and
the fitting part sets a cylindrical temporary model on the left leg and the right leg of the human body model and sets a saddle-shaped temporary model on a hip of the human body model such that a ridge line thereof is laid in parallel to a horizontal direction of the human body model and faces the legs.

9. A non-transitory computer-readable recording medium which stores clothing simulation program, the program causing a computer to function as at least:
human body model acquisition means for acquiring a human body model showing a three-dimensional shape of a human body;
paper pattern model acquisition means for acquiring a paper pattern model showing a two-dimensional shape of a pattern paper of a clothing that is fitted virtually to the human body model;
fabric model acquisition means for acquiring a fabric model showing dynamic characteristics of a fabric configuring the clothing;
fitting means for dividing the paper pattern model into a plurality of elements, imparting the dynamic characteristics shown by the fabric model to each element, deforming the paper pattern model by solving a motion equation of each element using a finite element method, and then fitting the clothing virtually to the human body model; and
clothing pressure calculation means for calculating a clothing pressure that is virtually applied to the human body model by the paper pattern model fitted by the fitting means,
wherein the fitting means sets a temporary model that is formed so as to cover a predetermined section of the human body model, deforms the paper pattern model to bring the paper pattern model into contact with the temporary model, and thereafter deforms the paper pattern model to bring the paper pattern model into contact with the human body model.

10. A clothing simulation method, comprising:
a human body model acquisition step in which a computer acquires a human body model showing a three-dimensional shape of a human body;
a paper pattern model acquisition step in which the computer acquires a paper pattern model showing a two-dimensional shape of a pattern paper of a clothing that is fitted virtually to the human body model;
a fabric model acquisition step in which the computer acquires a fabric model showing dynamic characteristics of a fabric configuring the clothing;
a fitting step in which the computer divides the paper pattern model into a plurality of elements, imparts the dynamic characteristics shown by the fabric model to each element, deforms the paper pattern model by solving a motion equation of each element using a finite element method, and then fits the clothing virtually to the human body model; and
a clothing pressure calculation step in which the computer calculates a clothing pressure that is virtually applied to the human body model by the paper pattern model fitted by the fitting step, wherein
in the fitting step, the fitting step sets a temporary model that is formed so as to cover a predetermined section of the human body model, deforms the paper pattern model to bring the paper pattern model into contact with the temporary model, and thereafter deforms the paper pattern model to bring the paper pattern model into contact with the human body model.

* * * * *